United States Patent [19]
Park

[11] Patent Number: 5,944,629
[45] Date of Patent: Aug. 31, 1999

[54] GEARTRAIN FOR A FIVE-SPEED AUTOMATIC TRANSMISSION

[75] Inventor: Jongsool Park, Kyunggi-do, Rep. of Korea

[73] Assignee: Hyundai Motor Company, Seoul, Rep. of Korea

[21] Appl. No.: 08/999,239

[22] Filed: Dec. 29, 1997

[30] Foreign Application Priority Data

Oct. 8, 1997 [KR] Rep. of Korea ...................... 97-51609

[51] Int. Cl.[6] ...................................................... F16H 3/62
[52] U.S. Cl. ........................ 475/279; 475/286; 475/290; 475/319
[58] Field of Search ................................... 475/276, 277, 475/278, 279, 280, 282, 284, 286, 288, 290, 311, 313, 317, 319, 323, 325

[56] References Cited

U.S. PATENT DOCUMENTS

| | | | |
|---|---|---|---|
| 3,941,013 | 3/1976 | Miller | 475/276 |
| 4,090,415 | 5/1978 | Gorrell et al. | 475/276 X |
| 5,342,257 | 8/1994 | Hotta et al. | 475/276 X |

*Primary Examiner*—Charles A Marmor
*Assistant Examiner*—Sherry Lynn Estremsky
*Attorney, Agent, or Firm*—Finnegan, Henderson, Farabow, Garrett & Dunner, L.L.P.

[57] ABSTRACT

A geartrain for a five-speed automatic transmission includes a first compound planetary gear unit comprising first and second simple planetary gearsets having first, second and third operating elements, the first operating element acting as an input element and a second compound planetary gear unit comprising third and fourth simple planetary gearsets having fifth, sixth, seventh and eighth operating elements. The fifth operating element acts as an output element. The sixth operating element is variably connected to either the first operating element or the second operating element, and the eighth operating element is fixedly connected to the third operating element. Clutches for variably connecting the sixth operating element to either the first operating element or the second operating element are provided. Brakes for selectively connecting at least one of the operating elements of the first and second planetary gear units to a transmission housing are provided.

35 Claims, 9 Drawing Sheets

FIG.8

*Friction Element Operation Chart*

| Shift Range / Friction Element | C1 | C2 | B1 | B2 |
|---|---|---|---|---|
| R |  |  | ○ | ○ |
| D1 | ○ |  | ○ |  |
| D2 | ○ |  |  | ○ |
| D3 | ○ | ○ |  |  |
| D4 |  | ○ |  | ○ |
| D5 |  | ○ | ○ |  |

5,944,629

GEARTRAIN FOR A FIVE-SPEED AUTOMATIC TRANSMISSION

BACKGROUND OF THE INVENTION

1. Field of the Invention

The present invention relates to a geartrain, and more particularly, to a geartrain for a five-speed automatic transmission used in vehicles, which can be designed to be compact in size and lightweight by reducing the number of frictional elements and planetary gearsets.

2. Description of the Related Art

Generally, automatic transmission systems for vehicles comprise a transmission control unit (TCU) which automatically controls shift ratios according to changes in a running condition of the vehicle.

The above-described TCU controls a plurality of friction elements provided in a geartrain to either operative or inoperative states to select one of the three essential elements of the planetary gearset (a sun gear, a ring gear, and a planet carrier) to be an input element, another a reaction element, and the last an output element, thereby controlling the number of output revolutions.

The geartrain is generally designed to realize four forward speeds and one reverse speed. However, with the development of high-power engines, geartrains have been developed to realize five forward speeds and one reverse speed.

The 5-speed geartrain is comprised of three simple planetary gearsets and at least six friction elements.

However, in such a geartrain for a 5-speed automatic transmission, to drive the vehicle in fourth or fifth speed-overdrive, there is a need for an element which rotates at a higher speed than that of a final output element. This results in power loss. In addition, the large number of friction elements results in a heavy and large-size automatic transmission.

SUMMARY OF THE INVENTION

The present invention has been made in an effort to solve the problems associated with the above described conventional geartrain.

It is an object of the present invention to provide a geartrain for a five-speed automatic transmission used in vehicles which, by omitting an element which rotates at a higher speed than a final output element needed in the prior art during overdrive, can minimize power loss.

It is another object of the present invention to provide a geartrain for a five-speed automatic transmission which can be designed to be compact in size and lightweight by reducing the number of friction elements.

To achieve the above objects, the present invention provides a geartrain for a five-speed automatic transmission, comprising:

a first compound planetary gear unit comprising first and second simple planetary gearsets having first, second, third, and fourth operating elements, said first operating element acting as an input element;

a second compound planetary gear unit comprising third and fourth simple planetary gearsets having fifth, sixth, seventh and eighth operating elements, said fifth operating element acting as an output element, said sixth operating element being variably connected to either the first operating element or the second operating element, and said eighth operating element being fixedly connected to the third operating element;

clutch means for variably connecting said sixth operating element to either the first operating element or the second operating element; and brake means for selectively connecting at least one of the operating elements of the first and second compound planetary gear units to a transmission housing.

According to a first embodiment, each of said first and second simple planetary gearsets is a single pinion planetary gearset. The first operating element is a combination of a sun gear of the first simple planetary gearset and a sun gear of the second simple planetary gearset; the second operating element is a planet carrier of the second simple planetary gearset; the third operating element is a combination of a planet carrier of the first simple planetary gearset and a ring gear of the second simple planetary gearset; and the fourth operating element is a ring gear of the first simple planetary gearset.

In the first embodiment, the third and fourth simple planetary gearsets is a double pinion planetary gearset. The fifth operating element is a combination of a planet carrier of the third simple planetary gearset and a sun gear of the fourth simple planetary gearset; the sixth operating element is a ring gear of the third simple planetary gearset; the seventh operating element is a ring gear of the fourth simple planetary gearset; and the eighth operating element is a combination of a sun gear of the third simple planetary gearset and a planet carrier of the fourth simple planetary gearset.

In the first embodiment, the clutch means comprises a first clutch interposed between the planet carrier of the second simple planetary gearset and the ring gear of the third simple planetary gearset and a second clutch interposed between the combination of the sun gears of the first and second simple planetary gearsets and the ring gear of the third simple planetary gearset.

In the first embodiment, the brake means comprises a first brake interposed between the ring gear of the first simple planetary gearset and the transmission housing and a second brake interposed between the ring gear of the fourth simple planetary gearset and the transmission housing.

According to a second embodiment, each of said first and second simple planetary gearsets is a single pinion planetary gearset, the third simple planetary gearset is a double pinion planetary gearset, and the fourth simple planetary gearset is a single pinion planetary gearset.

The operating elements of the first compound planetary gear second embodiment are the same as those of the first embodiment.

In the second embodiment, the fifth operating element is a combination of a planet carrier of the third simple planetary gearset and a sun gear of the fourth simple planetary gearset; the sixth operating element is a ring gear of the third simple planetary gearset; the seventh operating element is a planet carrier of the fourth simple planetary gearset; and the eighth operating element is a combination of a sun gear of the third simple planetary gearset and a ring gear of the fourth simple planetary gearset.

In the second embodiment, the clutch means comprises a first clutch interposed between the planet carrier of the second simple planetary gearset and the ring gear of the third simple planetary gearset and a second clutch interposed between the combination of the sun gears of the first and second simple planetary gearsets and the ring gear of the third simple planetary gearset.

In the second embodiment, the brake means comprises a first brake interposed between the ring gear of the first simple planetary gearset and the transmission housing and a second brake interposed between the planet carrier of the fourth simple planetary gearset and the transmission housing.

According to a third embodiment of the present invention, each of said first and second simple planetary gearsets is a single pinion planetary gearset, and each of the third and fourth simple planetary gearsets is a single pinion planetary gearset.

The operating elements of the first compound planetary gear unit are the same as those of the first embodiment.

In the third embodiment, the fifth operating element is a combination of a ring gear of the third simple planetary gearset and a sun gear of the fourth simple planetary gearset; the sixth operating element is a planet carrier of the third simple planetary gearset; the seventh operating element is a planet carrier of the fourth simple planetary gearset; and the eighth operating element is a combination of a sun gear of the third simple planetary gearset and a ring gear of the fourth simple planetary gearset.

In the third embodiment, the clutch means comprises a first clutch interposed between the planet carrier of the second simple planetary gearset and the planet carrier of the third simple planetary gearset and a second clutch interposed between the combination of the sun gears of the first and second simple planetary gearsets and the planet carrier of the third simple planetary gearset.

In the third embodiment, the brake means comprises a first brake interposed between the ring gear of the first simple planetary gearset and the transmission housing and a second brake interposed between the planet carrier of the fourth simple planetary gearset and the transmission housing.

According to a fourth embodiment of the present invention, the operating element of the first compound planetary gear unit of the fourth embodiment are the same as those of the first embodiment.

In the fourth embodiment, the third simple planetary gearset is a single pinion planetary gearset, and the fourth simple planetary gearset is a double pinion planetary gearset.

In the fourth embodiment, the fifth operating element is a combination of a ring gear of the third simple planetary gearset and a sun gear of the fourth simple planetary gearset; the sixth operating element is a planet carrier of the third simple planetary gearset; the seventh operating element is a ring gear of the fourth simple planetary gearset; and the eighth operating element is a combination of a sun gear of the third simple planetary gearset and a planet carrier of the fourth simple planetary gearset.

In the fourth embodiment, the clutch means comprises a first clutch interposed between the planet carrier of the second simple planetary gearset and the planet carrier of the third simple planetary gearset and a second clutch interposed between the combination of the sun gears of the first and second simple planetary gearsets and the planet carrier of the third simple planetary gearset.

In the fourth embodiment, the brake means comprises a first brake interposed between the ring gear of the first simple planetary gearset and the transmission housing and a second brake interposed between the ring gear of the fourth simple planetary gearset and the transmission housing.

According to a fifth embodiment, the first simple planetary gearset is a single pinion planetary gearset and the second simple planetary gearset is a double pinion planetary gearset.

In the fifth embodiment, the first operating element is a combination of a sun gear of the first simple planetary gearset and a sun gear of the second simple planetary gearset; the second operating element is a ring gear of the second simple planetary gearset; the third operating element is a combination of a planet carrier of the first simple planetary gearset and a planet carrier of the second simple planetary gearset; and the fourth operating element is a ring gear of the first simple planetary gearset.

In the fifth embodiment, each of the third and fourth simple planetary gearsets is a single pinion planetary gearset.

In the fifth embodiment, the fifth operating element is a combination of a ring gear of the third simple planetary gearset and a sun gear of the fourth simple planetary gearset; the sixth operating element is a planet carrier of the third simple planetary gearset; the seventh operating element is a planet carrier of the fourth simple planetary gearset; and the eighth operating element is a combination of a sun gear of the third simple planetary gearset and a ring gear of the fourth simple planetary gearset.

In the fifth embodiment, the clutch means comprises a first clutch interposed between the combination of the sun gears of the first and second simple planetary gearsets and the planet carrier of the third simple planetary gearset and a second clutch interposed between the ring gear of the second simple planetary gearsets and the planet carrier of the third simple planetary gearset.

In the fifth embodiment, the brake means comprises a first brake interposed between the ring gear of the first simple planetary gearset and the transmission housing and a second brake interposed between the planet carrier of the fourth simple planetary gearset and the transmission housing.

According to sixth embodiment of the present invention, the operating elements of the first compound planetary gear unit of the sixth embodiment are the same as those of the fifth embodiment.

In the sixth embodiment, the third simple planetary gearset is a single pinion planetary gearset and the fourth simple planetary gearset is a double pinion planetary gearset.

In the sixth embodiment, the fifth operating element is a combination of a ring gear of the third simple planetary gearset and a sun gear of the fourth simple planetary gearset; the sixth operating element is a planet carrier of the third simple planetary gearset; the seventh operating element is a ring gear of the fourth simple planetary gearset; and the eighth operating element is a combination of a sun gear of the third simple planetary gearset and a planet carrier of the fourth simple planetary gearset.

In the sixth embodiment, the clutch means comprises a first clutch interposed between the combination of the sun gears of the first and second simple planetary gearsets and the planet carrier of the third simple planetary gearset and a second clutch interposed between the ring gear of the second simple planetary gearsets and the planet carrier of the third simple planetary gearset.

In the sixth embodiment, the brake means comprises a first brake interposed between the ring gear of the first simple planetary gearset and the transmission housing and a second brake interposed between the ring gear of the fourth simple planetary gearset and the transmission housing.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 8 is a chart illustrating the operation of friction elements in each shift range of a power train according to a preferred embodiment of the present invention;

DESCRIPTION OF THE PREFERRED EMBODIMENTS

Preferred embodiments of the present invention will now be described in detail with reference to the accompanying drawings.

[First Embodiment]

Figure 1:
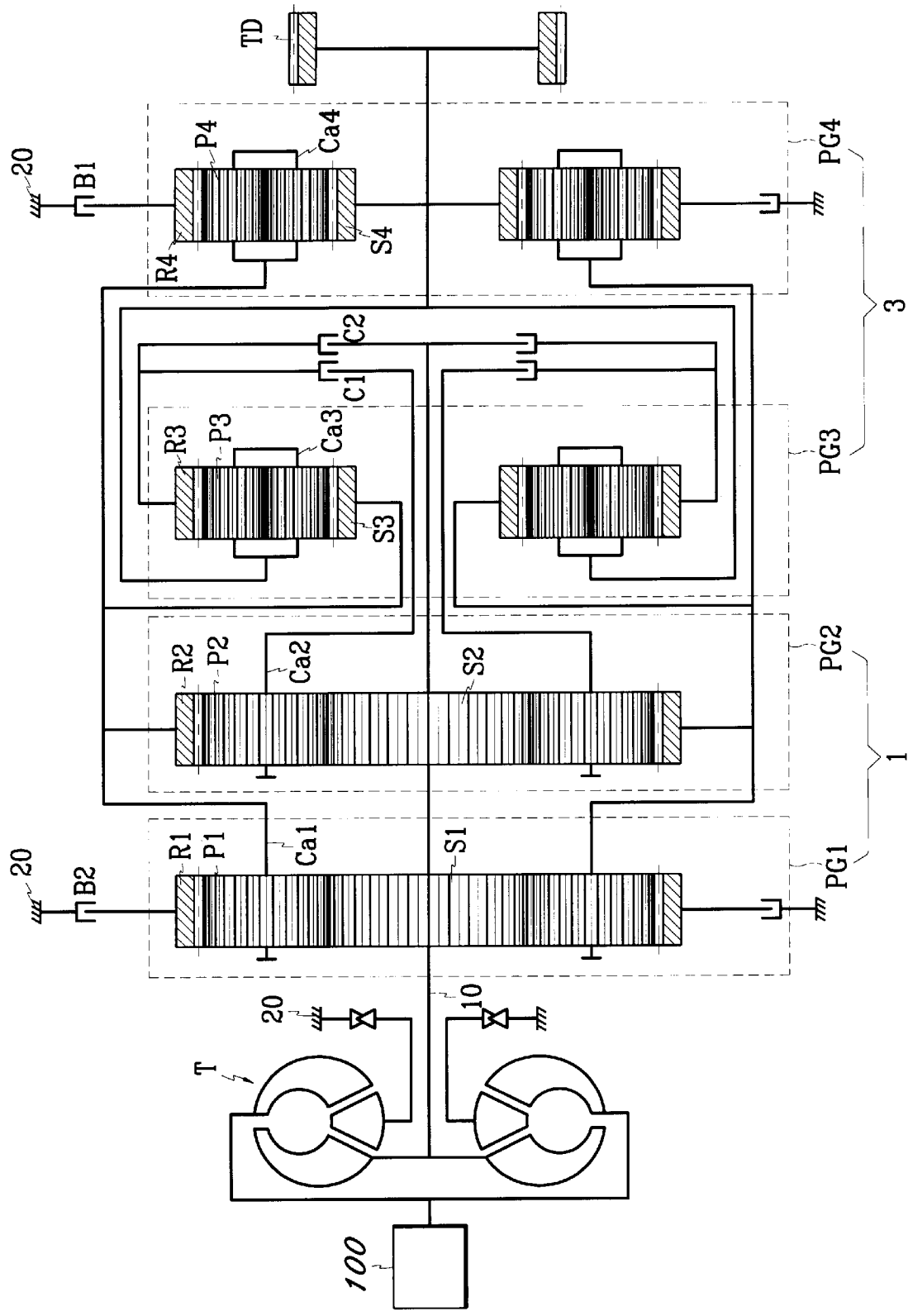
FIG. 1 is a schematic diagram illustrating a geartrain according to a first embodiment of the present invention.

Referring first to FIG. 1, there is shown a schematic diagram of a geartrain according to a first embodiment of the present invention.

The geartrain of this embodiment comprises an engine 100 for generating power, a torque converter T for multiplying torque generated from the engine, and first and second compound planetary gear units 1 and 3 for receiving converted torque through an input shaft 10 and for outputting five forward speeds and one reverse speed to a transfer drive gear TD.

The first compound planetary gear unit 1 has a first simple planetary gearset PG1 that is a single pinion planetary gearset and a second simple planetary gearset PG2 that is also a single pinion planetary gearset.

In the first compound planetary gear unit 1, a sun gear S1 of the first simple planetary gearset PG1 is fixedly connected to a sun gear S2 of the second simple planetary gearset PG2, and a planet carrier Ca1, connecting pinion gears P1 to each other, of the first simple planetary gearset PG1 is fixedly connected to a ring gear R2 of the second simple planetary gearset PG2.

Therefore, the first compound planetary gear unit 1 consists of four operating elements, i.e., a ring gear R1 of the first simple planetary gearset PG1, a planet carrier Ca2, connecting pinion gears P2 to each other, of the second simple planetary gearset PG2, a combination of the sun gears S1 and S2, and a combination of the planet carrier Ca1 and the ring gear R2.

The combination of the sun gears S1 and S2 of the first and second simple planetary gearsets PG1 and PG2 is fixedly mounted around the input shaft 10 to act as an input element. The ring gear R1 of the first simple planetary gearset PG1 is variably connected to a transmission housing 20 to selectively act as a reacting element.

The second compound planetary gear unit 3 has a third simple planetary gearset PG3 that is a double pinion planetary gearset and a fourth simple planetary gearset PG4 that is also a double pinion planetary gearset.

In the second compound planetary gear unit 3, a sun gear S3 of the third simple planetary gearset PG3 is fixedly connected to a planet carrier Ca4, connecting pinion gears P4 to each other, of the fourth simple planetary gearset PG4, and a planet carrier Ca3, connecting pinion gears P3 to each other, of the third simple planetary gearset PG3 is fixedly connected to a sun gear S4 of the fourth simple planetary gearset PG4. Therefore, the second compound planetary gear unit 3 consists of four operating elements, i.e., a ring gear R3 of the third simple planetary gearset PG3, a ring gear R4 of the fourth simple planetary gearset PG4, a combination of the sun gear S3 and the planet carrier Ca4, and a combination of the planet carrier Ca3 and the sun gear S4.

The ring gear R4 of the fourth simple planetary gearset PG4 is variably connected to the transmission housing 20 to selectively act as a reacting element.

The above described first and second compound planetary gear units 1 and 3 are combined to each other. That is, the combination of the planet carrier Ca1 and ring gear R2 of the first and second simple planetary gearsets PG1 and PG2 is fixedly connected to the combination of the sun gear S3 and planet carrier Ca4 of the third and fourth planetary gearsets PG3 and PG4; the planet carrier Ca2 of the second simple planetary gearset PG2 is variably connected to the ring gear R3 of the third simple planetary gearset PG3; the combination of the sun gears S1 and S2 of the first and second simple planetary gearsets PG1 and PG2 is variably connected to the ring gear R3 of the third simple planetary gearset PG3; and the combination of the planet carrier Ca3 and sun gear S4 of the third and fourth simple planetary gearsets PG3 and PG4 is fixedly connected to the transfer drive gear TD which transmits shifted rotating force to a final reduction gear (not shown).

A first clutch C1 is interposed between the planet carrier Ca2 of the second simple planetary gearset PG2 and the ring gear R3 of the third simple planetary gearset PG3. The first clutch C1 is operated in forward first, second and third speeds to interconnect the planet carrier Ca2 and the ring gear R3 so that the ring gear R3 acts as an input element. A second clutch C2 is interposed between the combination of the sun gears S1 and S2 of the first and second simple planetary gearsets PG1 and PG2 and the ring gear R3 of the third simple planetary gearset PG3. The second clutch C2 is operated in forward third, fourth and fifth speeds to interconnect the sun gear S2 and the ring gear R3 so that the ring gear R3 acts as an input element.

In addition, a first brake B1 is interposed between the ring gear R4 of the fourth simple planetary gearset PG4 and the transmission housing 20. The first brake B1 is engaged to fix the ring gear R4 in forward first and fifth speeds and reverse speed. A second brake B2 is interposed between the ring gear R1 of the first simple planetary gearset PG1 and the transmission housing 20, such that it can operate in the forward second and fourth speeds and the reverse speed to fix the ring gear R1.

Figure 7:
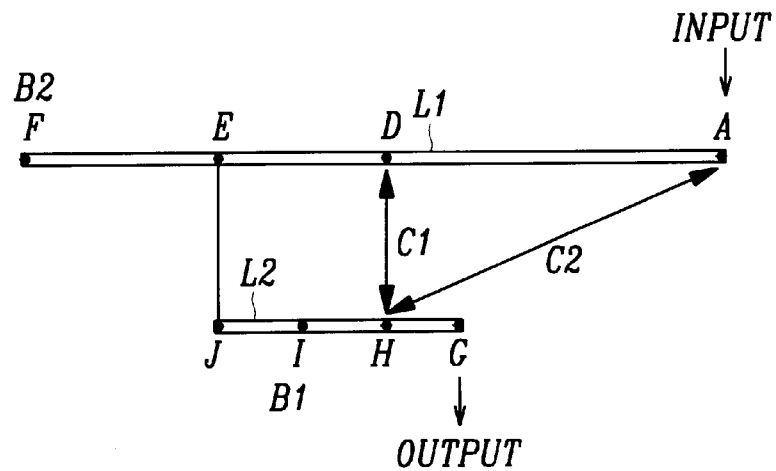
FIG. 7 is a lever analogy representation which can be obtained through geartrains according to various embodiments of the present invention depicted in FIGS. 1–6.

The above described geartrain can be illustrated as a lever representation as shown in FIG. 7. In FIG. 7, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

Describing the first lever L1 more in detail, the first operating element A indicates the combination of the sun gears S1 and S2 of the first and second simple planetary gearsets PG1 and PG2, the second operating element D indicates the planet carrier Ca2 of the second simple planetary gearset PG2, the third operating element E indicates the combination of the planet carrier Ca1 and ring gear R2 of the first and second simple planetary gearset PG1 and PG2, and the fourth operating element F indicates the ring gear R1 of the first simple planetary gearset PG1.

In addition, in the second lever L2, the first operating element G indicates the combination of the planet carrier Ca3 and sun gear S4 of the third and fourth simple planetary gearsets PG3 and PG4, and the second operating element H indicates the ring gear R3 of the third simple planetary gearset PG3. The third operating element I indicates the ring gear R4 of the fourth simple planetary gearsets PG4, and the fourth operating element J indicates the combination of the sun gear S3 and planet carrier Ca4 of the third and fourth simple planetary gearsets PG3 and PG4.

As described above, the first clutch C1 is interposed between the second operating element D indicating the planet carrier Ca2 of the second simple planetary gearset PG2 and the second operating element H indicating the ring gear R3 of the third simple planetary gearset PG3 to selectively interconnect the operating elements D and H. The second clutch C2 is interposed between the first operating element A indicating the combination of the sun gears S1 and S2 of the first and second simple planetary gearsets PG1 and PG2 and the second operating element H indicating the ring gear R3 of the third simple planetary gearset PG3 to interconnect the operating elements A and H.

In addition, the first brake B1 is interposed between the third operating element I indicating the ring gear R4 of the fourth simple planetary gearset PG4 and the transmission housing 20 to selectively fix the third operating element I. The second brake B2 is interposed between the fourth operating element F indicating the ring gear R1 of the first simple planetary gearset PG1 and the transmission housing 20 to selectively fix the fourth operating element F.

Figure 9:
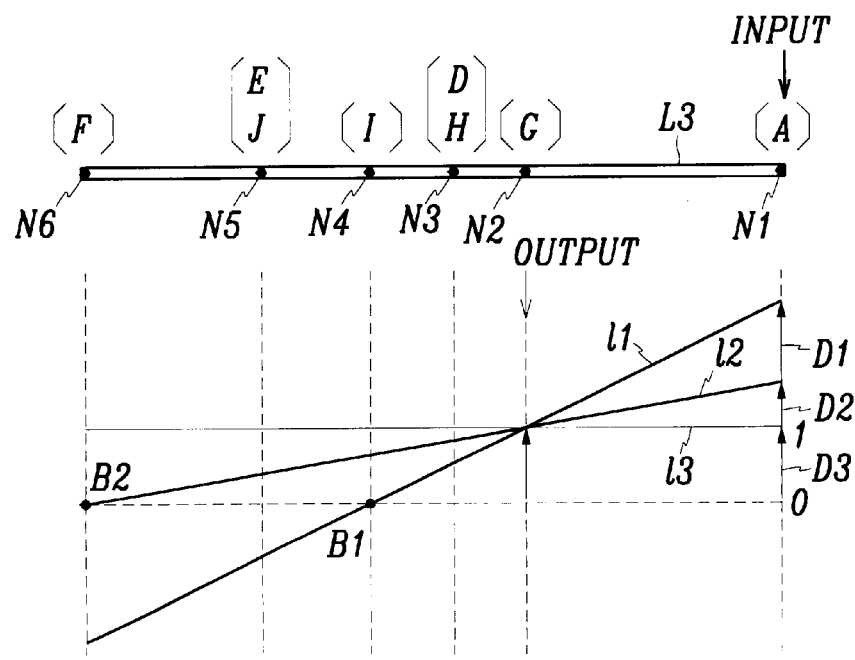
FIG. 9 is a schematic diagram illustrating an operation of forward first, second and third speeds of a geartrain according to a preferred embodiment of the present invention through a lever analogy.

In the forward first, second and third speeds D1, D2 and D3, since the first clutch C1 is operated as charted in FIG. 8, the lever representation of FIG. 7 can be illustrated as a single third lever L3 having first, second, third, fourth, fifth and sixth nodes N1, N2, N3, N4, N5 and N6 as shown in FIG. 9.

That is, in the third lever L3, the first node N1 indicates the first operating element A of the first compound planetary gear unit 1, the second node N2 indicates the first operating element G of the second compound planetary gear unit 3, the third node N3 indicates the combination of the second operating elements D and H of the first and second compound planetary gear units 1 and 3, the fourth node N4 indicates the third operating element I of the second compound planetary gear unit 3, the fifth node N5 indicates the combination of the third operating element E of the first compound planetary gear unit 1 and the fourth operating element J of the second compound planetary gear unit 3, and the sixth node N6 indicates the fourth operating element F of the first compound planetary gear unit 1. Through this lever analogy, shift ratios of the forward first, second and third speeds can be demonstrated.

Forward First Speed

In the forward first speed D1, the first clutch C1 and the first brake B1 are operated as charted in FIG. 8. Accordingly, the first node N1 indicating the first operating element A of the first compound planetary gear unit 1 becomes the input element, and the fourth node N4 indicating the third operating element I of the second compound planetary gear unit 3 becomes a reacting element. Accordingly, the first forward speed is outputted through the first operating element G of the second compound planetary gear unit 3.

Namely, the combination of the sun gears S1 and S2 of the first and second simple planetary gearsets PG1 and PG2 becomes the input element, the ring gear R4 of the fourth simple planetary gearset PG4 becomes the reacting element. The combination of the planet carrier Ca3 and sun gear S4 of the third and fourth simple planetary gearsets PG3 and PG4 becomes the output element.

Therefore, when assuming that the output revolution number of the combination of the planet carrier Ca3 and the sun gear S4 is "1", a line connecting the output point of the second node N2, acting as the output element, to the fourth node N4, acting as the reacting element, becomes the first speed line 11. At this point, the number of input revolution D1 of the first node N1 becomes the first input speed which is higher than the output speed "1". This shows that speed reduction is realized.

In the first speed state, the elements in the third node N3 rotate in the output direction at a number of revolutions less than that of the output while the elements in the fourth node N4 idle in the output direction and the elements of the fifth and sixth node N5 and N6 rotate in the opposite direction of the output.

Forward Second Speed

If throttle opening is increased in the forward first speed state, the first brake B1 is disengaged, while the second brake B2 is operated. Accordingly, the reacting element is changed from the fourth node N4 to the sixth node N6 indicating the fourth operating element F of the first compound planetary gear unit 1.

Namely, the ring gear R1 of the first simple planetary gearset PG1 becomes the reacting element. Accordingly, the second speed is outputted through a transfer drive gear TD fixed to the combination of the planet carrier Ca3 and sun gear S4 of the third and fourth simple planetary gearsets PG3 and PG4.

That is, when the number of output revolution of the sun gear S4 is assumed to be "1", a line connecting the output speed point of the second node N2, acting as an output element, to the sixth node N6, acting as the reacting element, becomes the second speed line 12. At this point, the number of input revolution D2 of the first node N1 becomes the second input speed which is higher than the output speed "1". This shows that speed reduction is realized.

In this forward second speed state, all operating elements of the third, fourth and fifth nodes N3, N4 and N5 rotate in the output direction at a number of revolutions less than that of the output.

Forward Third Speed

If the throttle opening is increased in the forward second speed state, the second brake B2 is released, while the second clutch C2 is operated. Accordingly, since the first and second compound planetary gear units 1 and 3 are locked as the input is realized through the first node N1, the forward third speed is outputted through the first operating element G of the second node N2.

That is, in a state where the input is realized through first node N1, since the first and second compound planetary gear units 1 and 3 are locked, the third speed is outputted through the transfer drive gear TD fixed to the combination of the planet carrier Ca3 and sun gear S4 of the third and fourth simple planetary gearsets PG3 and PG4.

That is, when assuming that the output revolution number of the sun gear S4 is "1", a line connecting the output speed point of the second node N2 to the equal level of the first node N1, acting as the input element, becomes the third speed line 13. At this point, the number of input revolution of the first node N1 becomes the third input speed D3 which is equal to that of the output speed "1". This shows that neither speed reduction nor speed increase occurs.

In this forward third speed state, all operating elements of the nodes N1 through N6 rotate in the output direction at the same number of revolutions as that of the output.

[Forward Fourth and Fifth Speeds]

Figure 10:
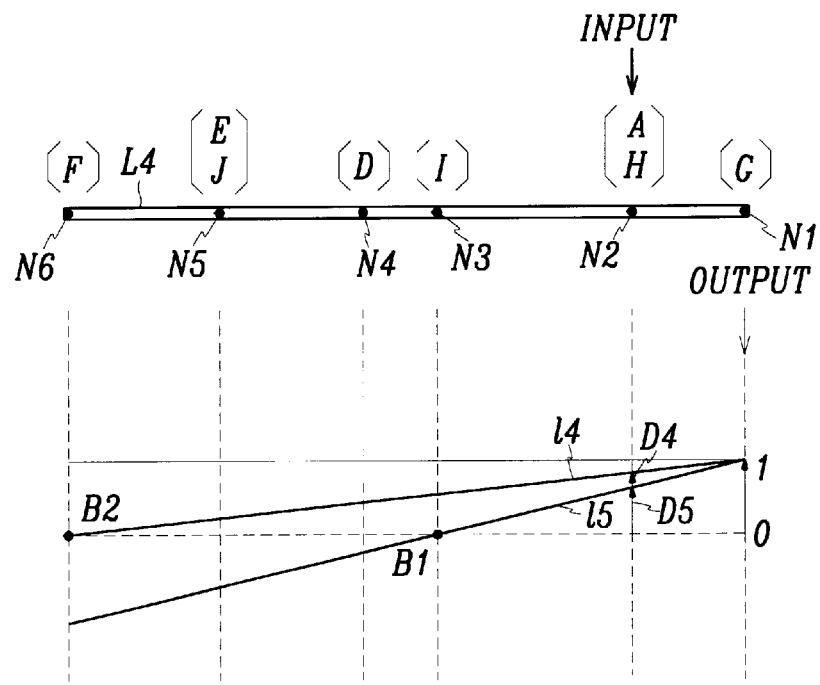
FIG. 10 is a schematic diagram illustrating an operation of forward fourth and fifth speeds of a geartrain according to a preferred embodiment of the present invention through a lever analogy diagram.

In the forward fourth and fifth speeds, since the second clutch C2 is operated as charted in FIG. 8, the first and second levers L1 and L2 can be illustrated as a single fourth lever L4 having first through sixth nodes N1, N2, N3, N4, N5 and N6 as shown in FIG. 10.

That is, in the fourth lever L4, the first node N1 indicates the first operating element G of the second compound planetary gear unit 3, the second node N2 indicates a combination of the first operating element A of the first compound planetary gear unit 1 and the second operating element H of the second compound planetary gear unit 3, the third node N3 indicates the third operating element I of the second compound planetary gear unit 3, the fourth node N4 indicates the second operating element D of the first compound planetary gear unit 1, the fifth node N5 indicates a combination of the third operating element E of the first compound planetary gear unit 1 and the fourth operating element J of the second compound planetary gear unit 3, and the sixth node N6 denotes the fourth operating element F of the first compound planetary gear unit 1. Through this lever analogy, shift ratios of the forward fourth and fifth speeds can be demonstrated.

Forward Fourth Speed

If the throttle opening is increased in the third speed state, the first clutch C1 is disengaged, while the second brake B2 is operated. Accordingly, the second node N2 indicating the combination of the first operating element A of the first planetary gear unit 1 and the second operating element H of the second compound planetary gear unit 3 becomes an input element, while the sixth node N6 indicating the fourth operating element F of the first compound planetary gear unit 1 becomes a reacting element. Therefore, the forward fourth speed is outputted through the first node N1 indicating the first operating element G of the second compound planetary gear unit 3.

Namely, the input element becomes the combination of the sun gears S1 and S2 and ring gear R3 of the first, second and third simple planetary gearsets PG1, PG2 and PG3, and the reacting element becomes the ring gear R1 of the first simple planetary gearset PG1. Accordingly, the forward fourth speed is outputed through the transfer drive gear TD fixed to the combination of the planet carrier Ca3 and sun gear S4 of the third and fourth simple planetary gearsets PG3 and PG4.

That is, when assuming that the output revolution number of the sun gear S4, i.e., the node N1, is "1", a line connecting the output speed point of the first node N1 to the sixth node N6, acting as the reacting element, becomes a fourth speed line 14. At this point, the number of input revolution D4 of the second node N2 becomes the fourth input speed which is less than the output speed "1". This shows that speed increase is realized. That is, the fourth speed state is an overdrive in which output speed is higher than the input speed.

In the fourth speed state, all the operating elements of the third, fourth and fifth nodes N3, N4 and N5 rotate in the output direction at the number of revolutions less than that of the output. Therefore, since there is no operating element which idles at a number of revolutions higher than that of output, power loss is prevented.

Forward Fifth Speed

If the throttle opening is increased in the fourth speed state, the second brake B2 is disengaged, while the first brake B1 is engaged. Accordingly, the second node N2 becomes the input element, while the third node N3 indicating the third operating element I of the second lever L2 becomes the reacting element. In addition, the first node N1 indicating the first operating element G of the second compound planetary gear unit 3 becomes the output element.

That is, the input element becomes a combination of the sun gears S1 and S2 and ring gear R3 of the first, second and third simple planetary gearset PG1, PG2 and PG3. The reacting element becomes the ring gear R4 of the fourth simple planetary gearset PG4. Therefore, the forward fifth speed is outputted through the transfer drive gear TD fixed to the combination of the ring gear R3 and sun gear S4 of the third and fourth simple planetary gearsets PG3 and PG4.

That is, when the number of output revolution of the sun gear S4, i.e., the node N1, is assumed to be "1", a line connecting the output speed point of the first node N1 to the third node N3, acting as the reacting element, becomes a fifth speed line 15. At this point, the number of input revolution D5 of the second node N2 becomes the fifth input speed which is less than the output speed "1". This shows that speed increase is realized. That is, the fifth speed state is an overdrive state in which the output speed is higher than the input speed.

In the fifth speed state, the operating element of the third node N3 rotates in the output direction at the number of revolutions less than that of the output, while the operating elements of the fourth, fifth and sixth nodes N4, N5 and N6 rotate in the opposition direction of the output direction. Therefore, since there is no operating element which idles at the number of revolutions higher than that of output, power loss is prevented.

Reverse Speed

When a shift mode is selected in a reverse mode, the first and second clutches C1 and C2 are disengaged, and the first and second brakes B1 and B2 are operated.

Figure 11:
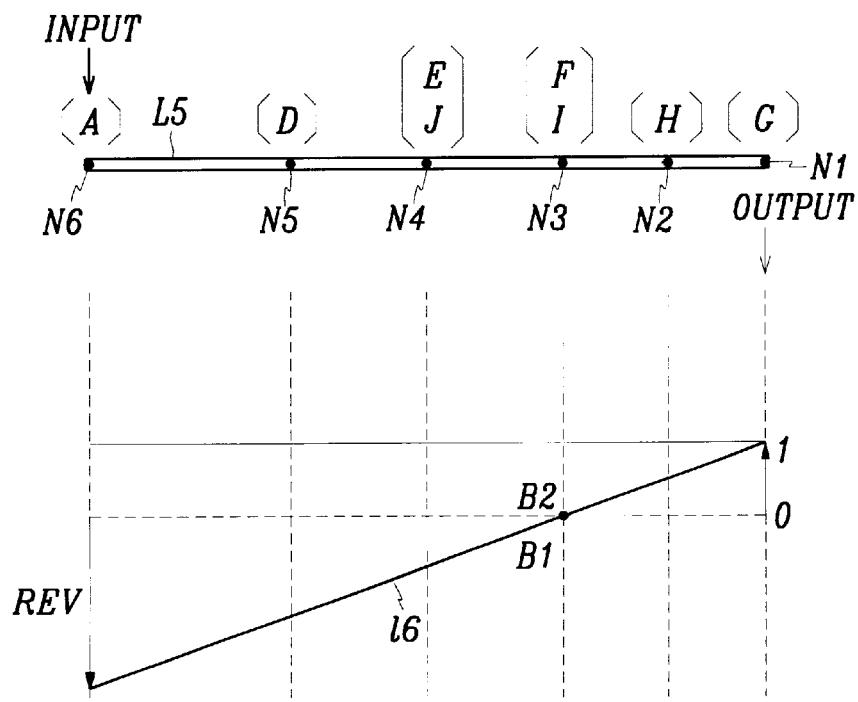
FIG. 11 is a schematic diagram illustrating an operation of reverse speed of a geartrain according to a preferred embodiment of the present invention through a lever analogy diagram.

Accordingly, in the reverse mode, the first and second levers L1 and L2 can be illustrated as a single lever L5 having first through sixth nodes N1 through N6 as shown in FIG. 11.

That is, in the fifth lever L5, the first node N1 indicates the first operating element G of the second compound planetary gear unit 3, the second node N2 indicates the second operating element H of the second compound planetary gear unit 3, the third node N3 indicates a combination of the fourth operating element F of the first compound planetary gear unit 1 and the third operating element I of the second compound planetary gear unit 3, the fourth node N4 indicates a combination of the third operating element E of the first compound planetary gear unit 1 and the fourth operating element J of the second compound planetary gear unit 3, the fifth node N5 denotes the second operating element D of the first compound planetary gear unit 1, and the sixth node N6 indicates the first operating element A of the first compound planetary gear unit 1. Through this lever analogy, the reverse speed can be demonstrated.

In the reverse mode, the first and second clutches C1 and C2 are disengaged, while the first and second brakes B1 and B2 are operated. Accordingly, the sixth node N6 indicating the first operating element A of the first compound planetary gear unit 1 becomes the input element, while the third node N3 indicating the combination of the fourth operating element F of the first compound planetary gear unit 1 and the third operating element I of the second compound planetary gear unit 3 becomes the reacting element. In addition, the first node N1 indicating the first operating element G of the second compound planetary gear unit 3 becomes the output element.

That is, the combination of the sun gears S1 and S2 of the first and second planetary gearsets PG1 and PG2 becomes the input element, while either the ring gear R1 of the first simple planetary gearset PG1 or the ring gear R4 of the fourth simple planetary gearsets PG1 and PG4 act as a reacting element. Therefore, the reverse speed is outputted through the transfer drive gear TD fixed to the combination of the planet carrier and sun gear Ca3 and S4 of the third and fourth planetary gearsets PG3 and PG4.

That is, when assuming that the output revolution number of the sun gear S4, i.e., the node N1, is "1" a line connecting the output speed point of the first node N1 to the third node N3, acting as the reacting element, becomes the reverse speed line 16. At this point, the number of input revolution REV of the sixth node N6 becomes the reverse input speed. That is, the direction of the input speed is opposite to the output speed.

[Second Embodiment]

Figure 2:
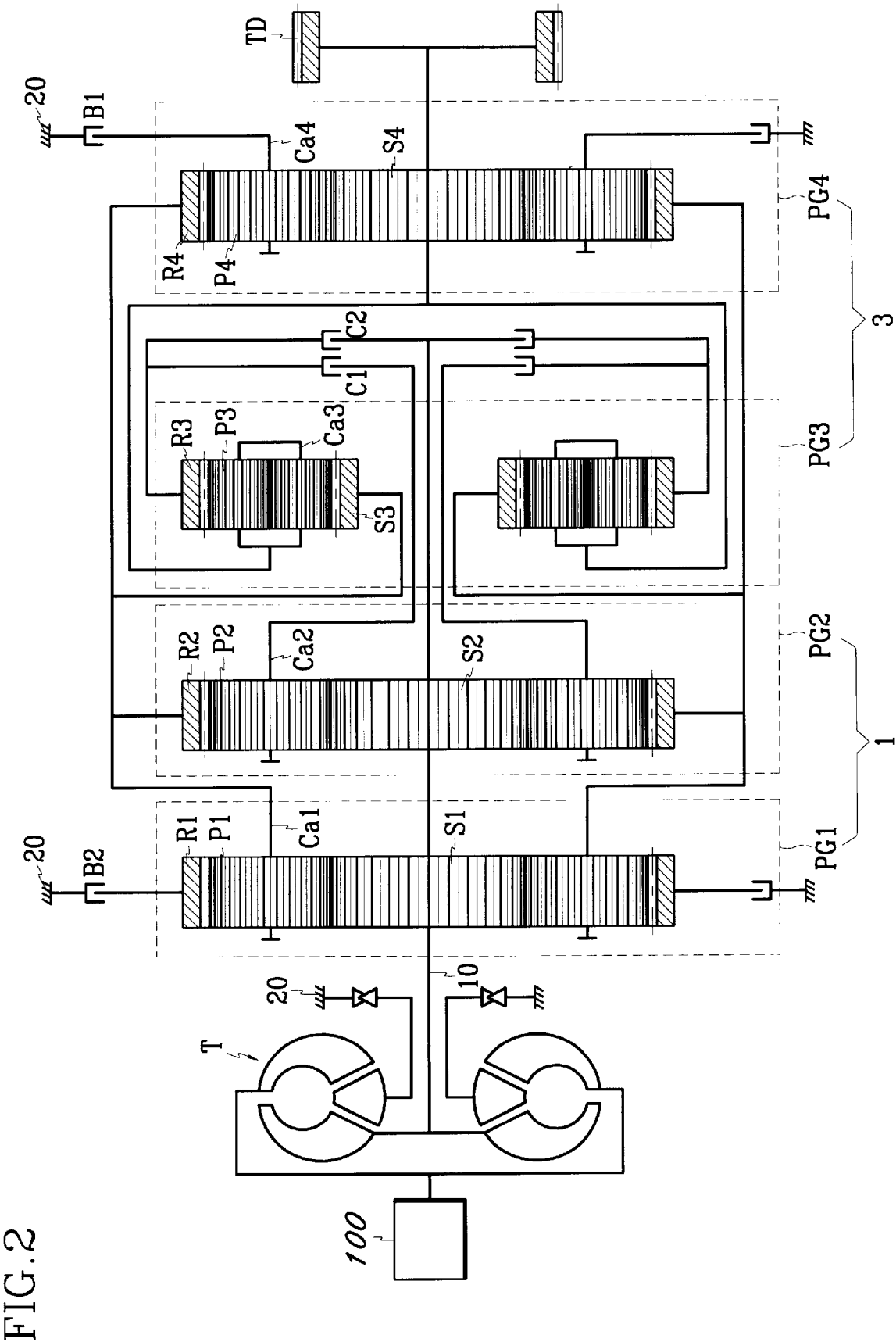
FIG. 2 is a schematic diagram illustrating a geartrain according to a second embodiment of the present invention.

Referring to FIG. 2, there is shown a schematic diagram of a geartrain according to a second embodiment of the present invention.

The geartrain of this embodiment comprises an engine 100 for generating power, a torque converter T for multiplying torque generated from the engine, and first and second compound planetary gear units 1 and 3 for receiving converted torque through an input shaft 10 and for outputting five forward speeds and one reverse speed to a transfer drive gear TD.

Since the structure of the first compound planetary gear unit 1 of this embodiment is the same as that of the first embodiment, the detailed description thereof will be omitted herein and incorporated as a reference.

The second compound planetary gear unit 3 has a third simple planetary gearset PG3 that is a double pinion planetary gearset and a fourth simple planetary gearset PG4 that is a single pinion planetary gearset.

In the second compound planetary gear unit 3, a sun gear S3 of the third simple planetary gearset PG3 is fixedly connected to a ring gear R4 of the fourth simple planetary gearset PG4, and a planet carrier Ca3, connecting pinion gears P3 to each other, of the third simple planetary gearset PG3 is fixedly connected to a sun gear S4 of the fourth simple planetary gearset PG4.

Therefore, the second compound planetary gear unit 3 consists of four operating elements, i.e., a ring gear R3 of the third simple planetary gearset PG3, a planet carrier Ca4, connecting the pinion gears P4 to each other, of the fourth simple planetary gearset PG4, a combination of the sun gear S3 and ring gear R4, and a combination of the planet carrier Ca3 and sun gear S4.

The combination of the planet carrier Ca3 and sun gear S4 of the third and fourth simple planetary gearsets PG3 and PG4 is fixedly connected to the transfer drive gear TD to act as an output element. The planet carrier Ca4 of the fourth simple planetary gearset PG4 is variably connected to a transmission hosing 20 to selectively act as a reacting element.

The above described first and second compound planetary gear units 1 and 3 are combined to each other. That is, the combination of the planet carrier Ca1 and ring gear R2 of the first and second simple planetary gearsets PG1 and PG2 is fixedly connected to the combination of the sun gear S3 and ring gear R4 of the third and fourth planetary gearsets PG3 and PG4; the planet carrier Ca2 of the second simple planetary gearset PG2 is variably connected to the ring gear R3 of the third simple planetary gearset PG3; and the combination of the sun gears S1 and S2 of the first and second simple planetary gearsets PG1 and PG2 is variably connected to the ring gear R3 of the third simple planetary gearset PG3.

A first clutch C1 is interposed between the planet carrier Ca2 of the second simple planetary gearset PG2 and the ring gear R3 of the third simple planetary gearset PG3. The first clutch C1 is operated in forward first, second and third speeds to interconnect the planet carrier Ca2 and the ring gear R3. A second clutch C2 is interposed between the combination of the sun gears S1 and S2 of the first and second simple planetary gearsets PG1 and PG2, and the ring gear R3 of the third simple planetary gearset PG3. The second clutch C2 is operated in forward third, fourth and fifth speeds to interconnect the combination of the sun gears S1 and S2, and the ring gear R3.

In addition, a first brake B1' is interposed between the planet carrier Ca4 of the fourth simple planetary gearset PG4 and the transmission housing 20. The first brake B1' is engaged to fix the planet carrier Ca4 in forward first and fifth speeds and reverse speed. A second brake B2 is interposed between the ring gear R1 of the first simple planetary gearset PG1 and the transmission housing 20, such that it can operate in the forward second and fourth speeds and the reverse speed to fix the ring gear R1.

The above described geartrain can be illustrated as a lever representation as shown in FIG. 7. In FIG. 7, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

Since the operating elements of the first lever L1 are the same as those of the first embodiment, the description thereof will be omitted herein and incorporated as a reference.

In addition, in the second lever L2, the first operating element G indicates the combination of the planet carrier Ca3 and sun gear S4 of the third and fourth simple planetary gearsets PG3 and PG4, and the second operating element H indicates the ring gear R3 of the third simple planetary gearset PG3. The third operating element I indicates the planet carrier Ca4 of the fourth simple planetary gearsets PG4, and the fourth operating element J indicates the combination of the sun gear S3 and ring gear R4 of the third and fourth simple planetary gearsets PG3 and PG4.

As described above, the first clutch C1 is interposed between the second operating element D indicating the planet carrier Ca2 of the second simple planetary gearset PG2 and the second operating element H indicating the ring gear R3 of the third simple planetary gearset PG3 to selectively interconnect the operating elements D and H. The second clutch C2 is interposed between the first operating element A indicating the combination of the sun gears S1 and S2 of the first and second simple planetary gearsets PG1 and PG2 and the second operating element H indicating the ring gear R3 of the third simple planetary gearset PG3 to selectively interconnect the operating elements A and H.

In addition, the first brake B1' is interposed between the third operating element I indicating the planet carrier Ca4 of the fourth simple planetary gearset PG4 and the transmission housing 20 to selectively fix the third operating element I. The second brake B2 is interposed between the fourth operating element F indicating the ring gear R1 of the first simple planetary gearset PG1 and the transmission housing 20 to selectively fix the fourth operating element F.

In the forward first, second and third speeds D1, D2 and D3, since the first clutch C1 is operated as charted in FIG. 8, the lever representation of FIG. 7 can be illustrated as a single third lever L3 having first, second, third, fourth, fifth and sixth nodes N1, N2, N3, N4, N5 and N6 as shown in FIG. 9.

That is, in the third lever L3, the first node N1 indicates the first operating element A of the first compound planetary gear unit 1, the second node N2 indicates the first operating element G of the second compound planetary gear unit 3, the third node N3 indicates the combination of the second operating elements D and H of the first and second compound planetary gear units 1 and 3, the fourth node N4 indicates the third operating element I of the second compound planetary gear unit 3, the fifth node N5 indicates a combination of the third operating element E of the first compound planetary gear unit 1 and the fourth operating element J of the second compound planetary gear unit 3, and the sixth node N6 indicates the fourth operating element F of the first compound planetary gear unit 1.

Namely, the first node N1 becomes the combination of the sun gears S1 and S2 of the first and second simple planetary gearsets PG1 and PG2, the second node N2 becomes the combination of the planet carrier Ca3 and sun gear S4 of the third and fourth simple planetary gearsets PG3 and PG4, the third node N3 becomes the combination of the planet carrier Ca2 and ring gear R3 of the second and third simple planetary gearsets PG2 and PG3, the fourth node N4 becomes the planet carrier Ca4 of the fourth simple planetary gearset PG4, the fifth node N5 becomes a combination of the planet carrier Ca1, ring gear R2, sun gear S3 and ring gear R4 of the first, second, third and fourth simple planetary gearsets PG1, PG2, PG3 and PG4, and the sixth node N6 becomes the ring gear R1 of the first simple planetary gearset PG1.

In the forward fourth and fifth speeds, since the second clutch C2 is operated as charted in FIG. 8, the first and second levers L1 and L2 can be illustrated as a single fourth lever L4 having first through sixth nodes N1, N2, N3, N4, N5 and N6 as shown in FIG. 10.

That is, in the fourth lever L4, the first node N1 indicates the first operating element G of the second compound planetary gear unit 3, the second node N2 indicates a combination of the first operating element A of the first compound planetary gear unit 1 and the second operating element H of the second compound planetary gear unit 3, the third node N3 indicates the third operating element I of the second compound planetary gear unit 3, the fourth node N4 indicates the second operating element D of the first compound planetary gear unit 1, the fifth node N5 indicates a combination of the third operating element E of the first compound planetary gear unit 1 and the fourth operating element J of the second compound planetary gear unit 3, and the sixth node N6 denotes the fourth operating element F of the first compound planetary gear unit 1.

That is, the first node N1 becomes the combination of the planet carrier Ca3 and sun gear S4 of the third and fourth simple planetary gearsets PG3 and PG4, the second node N2 becomes the combination of the sun gears S1 and S2 and ring gear R3 of the first, second and third planetary gearsets PG1, PG2 and PG3, the third node N3 becomes the planet carrier Ca4 of the fourth simple planetary gearset PG4, the fourth node N4 becomes the planet carrier Ca2 of the second simple planetary gearset PG2, the fifth node N5 becomes the planet carrier, ring gear, sun gear and ring gear Ca1, R2, S3 and R4 of the first, second, third and fourth simple planetary gearsets PG1, PG2, PG3 and PG4, and the sixth node N6 becomes the ring gear R1 of the first simple planetary gearset PG1.

When a shift mode is selected in a reverse mode, the first and second clutches C1 and C2 are disengaged, and the first and second brakes B1 and B2 are operated as charted in FIG. 8.

Accordingly, in the reverse mode, the first and second levers L1 and L2 can be illustrated as a single lever L5 having first through sixth nodes N1 through N6 as shown in FIG. 11.

That is, in the fifth lever L5, the first node N1 indicates the first operating element G of the second compound planetary gear unit 3, the second node N2 indicates the second operating element H of the second compound planetary gear unit 3, the third node N3 indicates a combination of the fourth operating element F of the first compound planetary gear unit 1 and the third operating element I of the second compound planetary gear unit 3, the fourth node N4 indicates a combination of the third operating element E of the first compound planetary gear unit 1 and the fourth operating element J of the second compound planetary gear unit 3, the fifth node N5 denotes the second operating element D of the first compound planetary gear unit 1, and the sixth node N6 indicates the first operating element A of the first compound planetary gear unit 1.

That is, the first node N1 becomes the combination of the planet carrier Ca3 and sun gear S4 of the third and fourth planetary gearsets PG3 and PG4, the second node N2 becomes the ring gear R3 of the third simple planetary gearset PG3, the third node N3 becomes the combination of the ring gear R1 and planet carrier Ca4 of the first and fourth simple planetary gearsets PG1 and PG4, the fourth node N4 becomes the combination of the planet carrier Ca1, ring gear R2, sun gear S3 and ring gear R4 of the first, second, third and fourth simple planetary gearsets PG1, PG2, PG3 and PG4, the fifth node N5 becomes the planet carrier Ca2 of the second simple planetary gearset PG2, and the sixth node N6 becomes the combination of the sun gears S1 and S2 of the first and second simple planetary gearsets PG1 and PG2.

[Third Embodiment]

Figure 3:
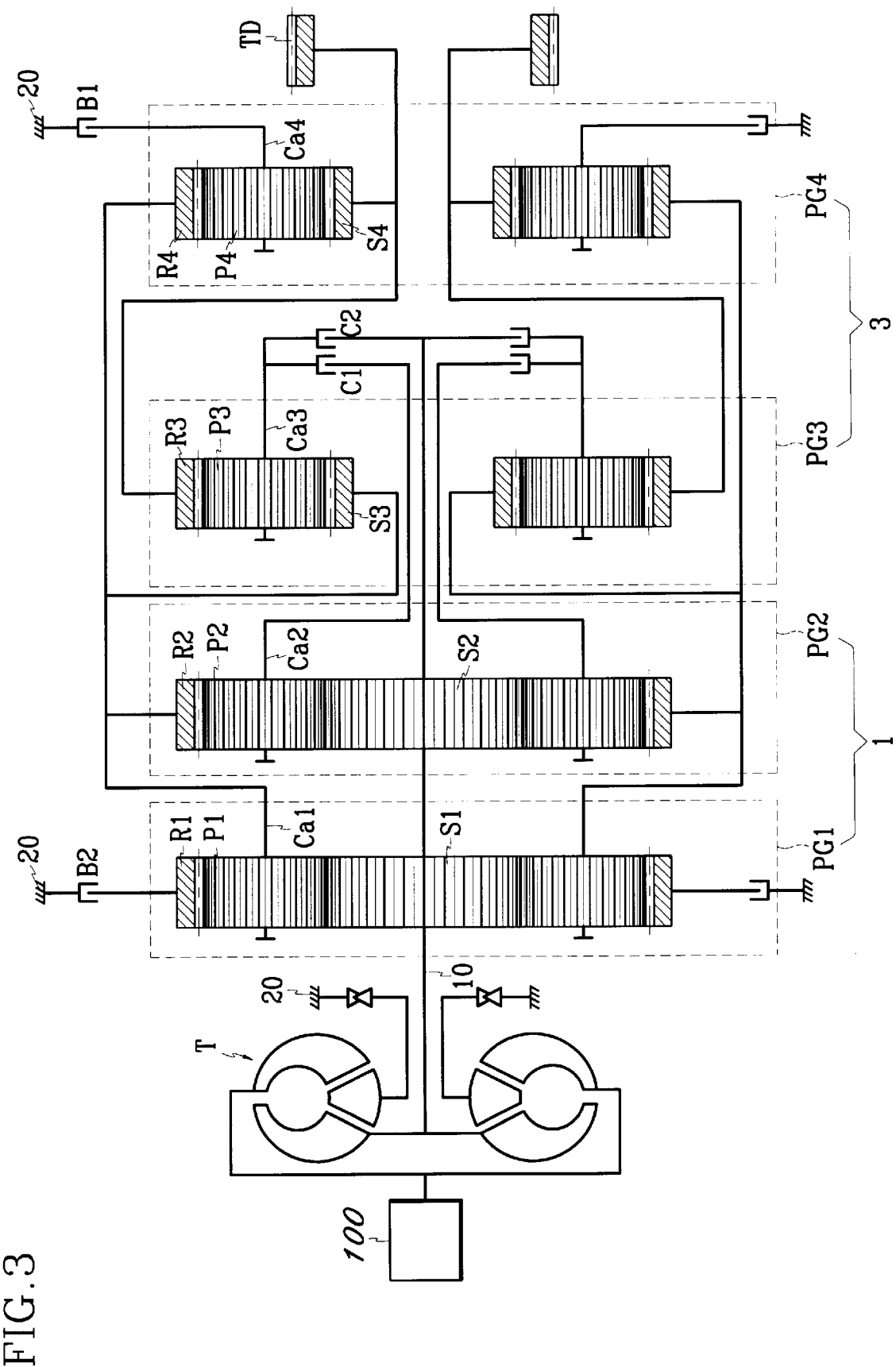
FIG. 3 is a schematic diagram illustrating a geartrain according to a third embodiment of the present invention.

Referring to FIG. 3, there is shown a schematic diagram of a geartrain according to a third embodiment of the present invention.

The geartrain of this embodiment comprises an engine E for generating power, a torque converter T for multiplying torque generated from the engine, and first and second compound planetary gear units 1 and 3 for receiving converted torque through an input shaft 10 and for outputting five forward speeds and one reverse speed to a transfer drive gear TD.

Since the structure of the first compound planetary gear unit 1 of this embodiment is the same as that of the first embodiment, the detailed description thereof will be omitted herein and incorporated as a reference.

The second compound planetary gear unit 3 has third and fourth simple planetary gearsets PG3 and PG4 each of which is a single pinion planetary gearset.

In the second compound planetary gear unit 3, a ring gear R3 of the third simple planetary gearset PG3 is fixedly connected to a sun gear S4 of the fourth simple planetary gearset PG4, and a sun gear S3 of the third simple planetary gearset PG3 is fixedly connected to a ring gear R4 of the fourth simple planetary gearset PG4. Therefore, the second compound planetary gear unit 3 consists of four operating elements, i.e., a planet carrier Ca3 of the third simple planetary gearset PG3, a planet carrier Ca4, connecting the pinion gears P4 to each other, of the fourth simple planetary gearset PG4, a combination of the ring gear R3 and sun gear S4, and a combination of the sun gear S3 and ring gear R4.

The combination of the ring gear R3 and sun gear S4 is fixedly connected to the transfer drive gear TD to act as an output element. The planet carrier Ca4 of the fourth simple planetary gearset PG4 is variably connected to a transmission housing 20 to selectively act as a reacting element.

The above described first and second compound planetary gear units 1 and 3 are combined to each other. That is, the combination of the planet carrier Ca1 and ring gear R2 of the first and second simple planetary gearsets PG1 and PG2 is fixedly connected to the combination of the sun gear S3 and ring gear R4 of the third and fourth planetary gearsets PG3 and PG4; the planet carrier Ca2 of the second simple planetary gearset PG2 is variably connected to the planet carrier Ca3 of the third simple planetary gearset PG3; and the combination of the sun gears S1 and S2 of the first and second simple planetary gearsets PG1 and PG2 is variably connected to the planet carrier Ca3 of the third simple planetary gearset PG3.

A first clutch C1' is interposed between the planet carrier Ca2 of the second simple planetary gearset PG2 and the planet carrier Ca3 of the third simple planetary gearset PG3. The first clutch C1' is operated in forward first, second and third speeds to interconnect the planet carrier Ca2 and the planet carrier Ca3. A second clutch C2 is interposed between the combination of the sun gears S1 and S2 of the first and second simple planetary gearsets PG1 and PG2 and the planet carrier Ca3 of the third simple planetary gearset PG3. The second clutch C2 is operated in forward third, fourth and fifth speeds to interconnect the combination of the sun gears S1 and S2 and planet carrier Ca3.

In addition, a first brake B1' is interposed between the planet carrier Ca4 of the fourth simple planetary gearset PG4 and the transmission housing 20. The first brake B1 is engaged to fix the planet carrier Ca4 in forward first and fifth speeds and reverse speed. A second brake B2 is interposed between the ring gear R1 of the first simple planetary gearset PG1 and the transmission housing 20, such that it can operate in the forward second and fourth speeds and the reverse speed to fix the ring gear R1.

The above described geartrain can be illustrated as a lever representation as shown in FIG. 7. In FIG. 7, levers L1 and L2 indicate the first and second compound planetary gear units 1 and 3, respectively. The four operating elements of the first compound planetary gear units I are indicated as first, second, third and fourth operating elements A, D, E and F on the first lever L1, and the four operating elements of the second compound planetary gear unit 3 are indicated as first, second, third and fourth operating elements G, H, I and J on the second lever L2.

The operation elements of the first lever of this embodiment are the same as those of the first embodiment, the detailed description thereof will be omitted herein and incorporated as a reference.

In the second lever L2, the first operating element G indicates the combination of the ring gear R3 and sun gear S4 of the third and fourth simple planetary gearsets PG3 and PG4, and the second operating element H indicates the planet carrier Ca3 of the third simple planetary gearset PG3. The third operating element I indicates the planet carrier Ca4 of the fourth simple planetary gearsets PG4, and the fourth operating element J indicates the combination of the sun gear S3 and ring gear R4 of the third and fourth simple planetary gearsets PG3 and PG4.

In the forward first, second and third speeds D1, D2 and D3, since the first clutch C1' is operated as charted in FIG. 8, the lever representation of FIG. 7 can be illustrated as a single third lever L3 having first, second, third, fourth, fifth and sixth nodes N1, N2, N3, N4, N5 and N6 as shown in FIG. 9.

That is, in the third lever L3, the first node N1 indicates the first operating element A of the first compound planetary gear unit 1, the second node N2 indicates the first operating element G of the second compound planetary gear unit 3, the third node N3 indicates the combination of the second operating elements D and H of the first and second compound planetary gear units 1 and 3, the fourth node N4 indicates the third operating element I of the second compound planetary gear unit 3, the fifth node N5 indicates a combination of the third operating element E of the first compound planetary gear unit 1 and the fourth operating element J of the second compound planetary gear unit 3, and the sixth node N6 indicates the fourth operating element F of the first compound planetary gear unit 1.

Namely, the first node N1 becomes the combination of the sun gears S1 and S2 of the first and second simple planetary gearsets PG1 and PG2, the second node N2 becomes the combination of the ring gear R3 and sun gear S4 of the third and fourth simple planetary gearsets PG3 and PG4, the third node N3 becomes the combination of the planet carriers Ca2 and Ca3 of the second and third simple planetary gearsets PG2 and PG3, the fourth node N4 becomes the planet carrier Ca4 of the fourth simple planetary gearset PG4, the fifth node N5 becomes a combination of the planet carrier Ca1, ring gear R2, sun gear S3 and the ring gear R4 of the first, second, third and fourth simple planetary gearsets PG1, PG2, PG3 and PG4, and the sixth node N6 becomes the ring gear R1 of the first simple planetary gearset PG1.

In the forward fourth and fifth speeds, since the second clutch C2 is operated as charted in FIG. 8, the first and second levers L1 and L2 can be illustrated as a single fourth lever L4 having first through sixth nodes N1, N2, N3, N4, N5 and N6 as shown in FIG. 10.

That is, in the fourth lever L4, the first node N1 indicates the first operating element G of the second compound planetary gear unit 3, the second node N2 indicates a combination of the first operating element A of the first compound planetary gear unit 1 and the second operating element H of the second compound planetary gear unit 3, the third node N3 indicates the third operating element I of the second compound planetary gear unit 3, the fourth node N4 indicates the second operating element D of the first compound planetary gear unit 1, the fifth node N5 indicates a combination of the third operating element E of the first compound planetary gear unit 1 and the fourth operating element J of the second compound planetary gear unit 3, and the sixth node N6 denotes the fourth operating element F of the first compound planetary gear unit 1.

That is, the first node N1 becomes the combination of the ring gear R3 and sun gear S4 of the third and fourth simple planetary gearsets PG3 and PG4, the second node N2 becomes the combination of the sun gears S1 and S2 and planet carrier Ca3 of the first, second and third simple planetary gearsets PG1, PG2 and PG3, the third node N3 becomes the planet carrier Ca4 of the fourth simple planetary gearset PG4, the fourth node N4 becomes the planet carrier Ca2 of the second simple planetary gearset PG2, the fifth node N5 becomes the planet carrier Ca1, ring gear R2, sun gear S3 and ring gear R4 of the first, second, third and fourth simple planetary gearsets PG1, PG2, PG3 and PG4, and the sixth node becomes the ring gear R1 of the first simple planetary gearset PG1.

When a shift mode is selected in a reverse mode, as charted in FIG. 8, the first and second clutches C1' and C2 are disengaged, and the first and second brakes B1' and B2 are operated.

Accordingly, in the reverse mode, the first and second levers L1 and L2 can be illustrated as a single lever L5 having first through sixth nodes N1 through N6 as shown in FIG. 11.

That is, in the fifth lever L5, the first node N1 indicates the first operating element G of the second compound planetary gear unit 3, the second node N2 indicates the second operating element H of the second compound planetary gear unit 3, the third node N3 indicates a combination of the fourth operating element F of the first compound planetary gear unit 1 and the third operating element I of the second compound planetary gear unit 3, the fourth node N4 indicates a combination of the third operating element E of the first compound planetary gear unit 1 and the fourth operating element J of the second compound planetary gear unit 3, the fifth node N5 denotes the second operating element D of the first compound planetary gear unit 1, and the sixth node N6 indicates the first operating element A of the first compound planetary gear unit 1.

That is, the first node N1 becomes the combination of the ring gear R3 and sun gear S4 of the third and fourth planetary gearsets PG3 and PG4, the second node N2 becomes the planet carrier Ca3 of the third simple planetary gearset PG3, the third node N3 becomes the combination of the ring gear R1 and planet carrier Ca4 of the first and fourth simple planetary gearsets PG1 and PG4, the fourth node N4 becomes the combination of the planet carrier Ca1, ring gear R2, sun gear S3 and ring gear R4 of the first, second, third and fourth simple planetary gearsets PG1, PG2, PG3 and PG4, the fifth node N5 becomes the planet carrier Ca2 of the second simple planetary gearset PG2, and the sixth node N6 becomes the combination of the sun gears S1 and S2 of the first and second simple planetary gearsets PG1 and PG2.

[Fourth Embodiment]

Figure 4:
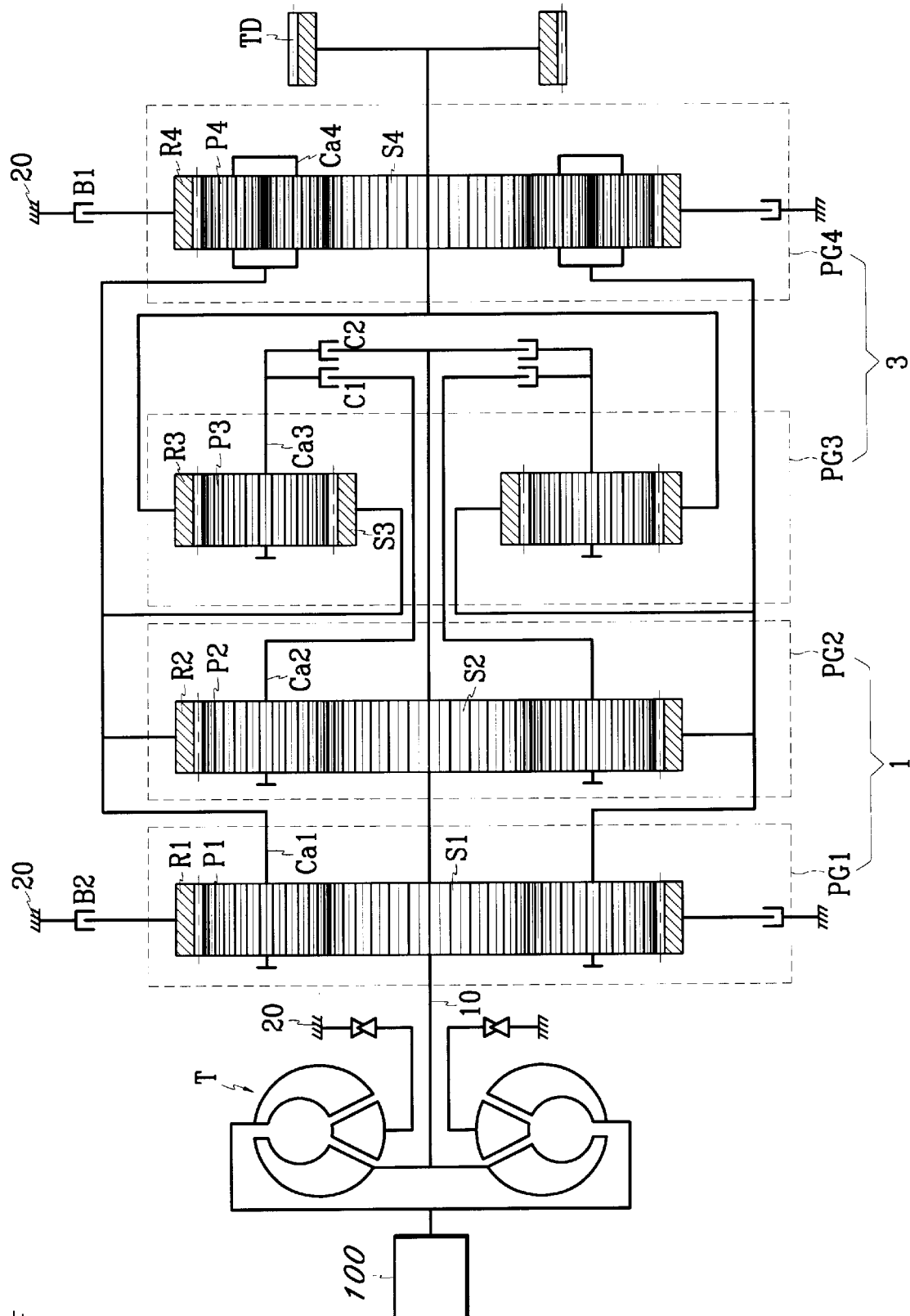
FIG. 4 is a schematic diagram illustrating a geartrain according to a fourth embodiment of the present invention.

Referring to FIG. 4, there is shown a schematic diagram of a geartrain according to a fourth embodiment of the present invention.

The geartrain of this embodiment comprises an engine 100 for generating power, a torque converter T for multiplying torque generated from the engine, and first and second compound planetary gear units 1 and 3 for receiving converted torque through an input shaft 10 and for outputting five forward speeds and one reverse speed to a transfer drive gear TD.

Since the structure of the first compound planetary gear unit 1 of this embodiment is the same as that of the first embodiment, the detailed description thereof will be omitted herein and incorporated as a reference.

The second compound planetary gear unit 3 has a third simple planetary gearset PG3 which is a single pinion gearset and a fourth simple planetary gearset PG4 which is a double pinion planetary gearset.

In the second compound planetary gear unit 3, a ring gear R3 of the third simple planetary gearset PG3 is fixedly connected to a sun gear S4 of the fourth simple planetary gearset PG4, and a sun gear S3 of the third simple planetary gearset PG3 is fixedly connected to a planet carrier Ca4 of the fourth simple planetary gearset PG4. Therefore, the second compound planetary gear unit 3 consists of four operating elements, i.e., a planet carrier Ca3 of the third simple planetary gearset PG3, a ring gear R4 of the fourth simple planetary gearset PG4, a combination of the ring gear R3 and sun gear S4, and a combination of the sun gear S3 and planet carrier Ca4.

The combination of the ring gear R3 and sun gear S4 is fixedly connected to the transfer drive gear TD to act as an output element. The ring gear R4 of the fourth simple planetary gearset PG4 is variably connected to a transmission hosing 20 to selectively act as a reacting element.

The above described first and second compound planetary gear units 1 and 3 are combined to each other. That is, the combination of the planet carrier Ca1 and ring gear R2 of the first and second simple planetary gearsets PG1 and PG2 is fixedly connected to the combination of the sun gear S3 and planet carrier Ca4 of the third and fourth planetary gearsets PG3 and PG4; the planet carrier Ca2 of the second simple planetary gearset PG2 is variably connected to the planet carrier Ca3 of the third simple planetary gearset PG3; and the combination of the sun gears S1 and S2 of the first and second simple planetary gearsets PG1 and PG2 is variably connected to the planet carrier Ca3 of the third simple planetary gearset PG3.

A first clutch C1' is interposed between the planet carrier Ca2 of the second simple planetary gearset PG2 and the planet carrier Ca3 of the third simple planetary gearset PG3. The first clutch C1' is operated in forward first, second and third speeds to interconnect the planet carrier Ca2 and the planet carrier Ca3. A second clutch C2 is interposed between the combination of the sun gears S1 and S2 of the first and second simple planetary gearsets PG1 and PG2 and the planet carrier Ca3 of the third simple planetary gearset PG3. The second clutch C2 is operated in forward third, fourth and fifth speeds to interconnect the combination of the sun gears S1 and S2 and the planet carrier Ca3.

In addition, a first brake B1 is interposed between the ring gear R4 of the fourth simple planetary gearset PG4 and the transmission housing 20. The first brake B1 is engaged to fix the ring gear R4 in forward first and fifth speeds and reverse speed. A second brake B2 is interposed between the ring gear R1 of the first simple planetary gearset PG1 and the transmission housing 20, such that it can operate in the forward second and fourth speeds and the reverse speed to fix the ring gear R1.

The above described geartrain can be illustrated as a lever representation as shown in FIG. 7. In FIG. 7, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

Since the structure of the first lever L1 is the same as that of the first embodiment, the detailed description thereof will be omitted herein and incorporated as a reference.

In addition, in the second lever L2, the first operating element G indicates the combination of the ring gear R3 and sun gear S4 of the third and fourth simple planetary gearsets PG3 and PG4, and the second operating element H indicates the planet carrier Ca3 of the third simple planetary gearset PG3. The third operating element I indicates the ring gear R4 of the fourth simple planetary gearsets PG4, and the fourth operating element J indicates the combination of the sun gear S3 and planet carrier Ca4 of the third and fourth simple planetary gearsets PG3 and PG4.

In the forward first, second and third speeds D1, D2 and D3, since the first clutch C' is operated as charted in FIG. 8, the lever representation of FIG. 7 can be illustrated as a single third lever L3 having first, second, third, fourth, fifth and sixth nodes N1, N2, N3, N4, N5 and N6 as shown in FIG. 9.

That is, in the third lever L3, the first node N1 indicates the first operating element A of the first compound planetary gear unit 1, the second node N2 indicates the first operating element G of the second compound planetary gear unit 3, the third node N3 indicates the combination of the second operating elements D and H of the first and second compound planetary gear units 1 and 3, the fourth node N4 indicates the third operating element I of the second compound planetary gear unit 3, the fifth node N5 indicates a combination of the third operating element E of the first compound planetary gear unit 1 and the fourth operating element J of the second compound planetary gear unit 3, and the sixth node N6 indicates the fourth operating element F of the first compound planetary gear unit 1.

Namely, the first node N1 becomes the combination of the sun gears S1 and S2 of the first and second simple planetary gearsets PG1 and PG2, the second node N2 becomes the combination of the ring gear R3 and sun gear S4 of the third and fourth simple planetary gearsets PG3 and PG4, the third node N3 becomes the combination of the planet carriers Ca2 and Ca3 of the second and third simple planetary gearsets PG2 and PG3, the fourth node N4 becomes the ring gear R4 of the fourth simple planetary gearset PG4, the fifth node N5 becomes a combination of the planet carrier Ca1, ring gear R2, sun gear S3 and planet carrier Ca4 of the first, second, third and fourth simple planetary gearsets PG1, PG2, PG3 and PG4, and the sixth node N6 becomes the ring gear R1 of the first simple planetary gearset PG1.

In the forward fourth and fifth speeds, since the second clutch C2 is operated as charted in FIG. 8, the first and second levers L1 and L2 can be illustrated as a single fourth lever L4 having first through sixth nodes N1, N2, N3, N4, N5 and N6 as shown in FIG. 10.

That is, in the fourth lever L4, the first node N1 indicates the first operating element G of the second compound planetary gear unit 3, the second node N2 indicates a combination of the first operating element A of the first compound planetary gear unit 1 and the second operating element H of the second compound planetary gear unit 3, the third node N3 indicates the third operating element I of the second compound planetary gear unit 3, the fourth node N4 indicates the second operating element D of the first compound planetary gear unit 1, the fifth node N5 indicates a combination of the third operating element E of the first compound planetary gear unit 1 and the fourth operating element J of the second compound planetary gear unit 3, and the sixth node N6 denotes the fourth operating element F of the first compound planetary gear unit 1.

That is, the first node N1 becomes the combination of the ring gear and sun gear R3 and S4 of the third and fourth simple planetary gearsets PG3 and PG4, the second node N2 becomes the combination of the sun gears S1 and S2 and planet carrier Ca3 of the first, second and third simple planetary gearsets PG1, PG2 and PG3, the third node N3 becomes the ring gear R4 of the fourth simple planetary gearsets PG4, the fourth node N4 becomes the planet carrier Ca2 of the second simple planetary gearset PG2, the fifth node N5 becomes the planet carrier Ca1, ring gear R2, sun gear S3 and planet carrier Ca4 of the first, second, third and fourth simple planetary gearsets PG1, PG2, PG3 and PG4, and the sixth node N6 becomes the ring gear R1 of the first simple planetary gearset PG1.

When a shift mode is selected in a reverse mode, the first and second clutches C1' and C2 are disengaged, and the first and second brakes B1 and B2 are operated as charted in FIG. 8.

Accordingly, in the reverse mode, the first and second levers L1 and L2 can be illustrated as a single lever L5 having first through sixth nodes N1 through N6 as shown in FIG. 11.

That is, in the fifth lever L5, the first node N1 indicates the first operating element G of the second compound planetary gear unit 3, the second node N2 indicates the second operating element H of the second compound planetary gear unit 3, the third node N3 indicates a combination of the fourth operating element F of the first compound planetary gear unit 1 and the third operating element I of the second compound planetary gear unit 3, the fourth node N4 indicates a combination of the third operating element E of the first compound planetary gear unit 1 and the fourth operating element J of the second compound planetary gear unit 3, the fifth node N5 denotes the second operating element D of the first compound planetary gear unit 1, and the sixth node N6 indicates the first operating element A of the first compound planetary gear unit 1.

That is, the first node N1 becomes the combination of the ring gear R3 and sun gear S4 of the third and fourth planetary gearsets PG3 and PG4, the second node N2 becomes the planet carrier Ca3 of the third simple planetary gearset PG3, the third node N3 becomes the combination of the ring gears R1 and R4 of the first and fourth simple planetary gearsets PG1 and PG4, the fourth node N4 becomes the combination of the planet carrier Ca1, ring gear R2, sun gear S3 and planet carrier Ca4 of the first, second, third and fourth simple planetary gearsets PG1, PG2, PG3 and PG4, the fifth node N5 becomes the planet carrier Ca2 of the second simple planetary gearset PG2, and the sixth node N6 becomes the combination of the sun gears S1 and S2 of the first and second simple planetary gearsets PG1 and PG2.

[Fifth Embodiment]

Figure 5:
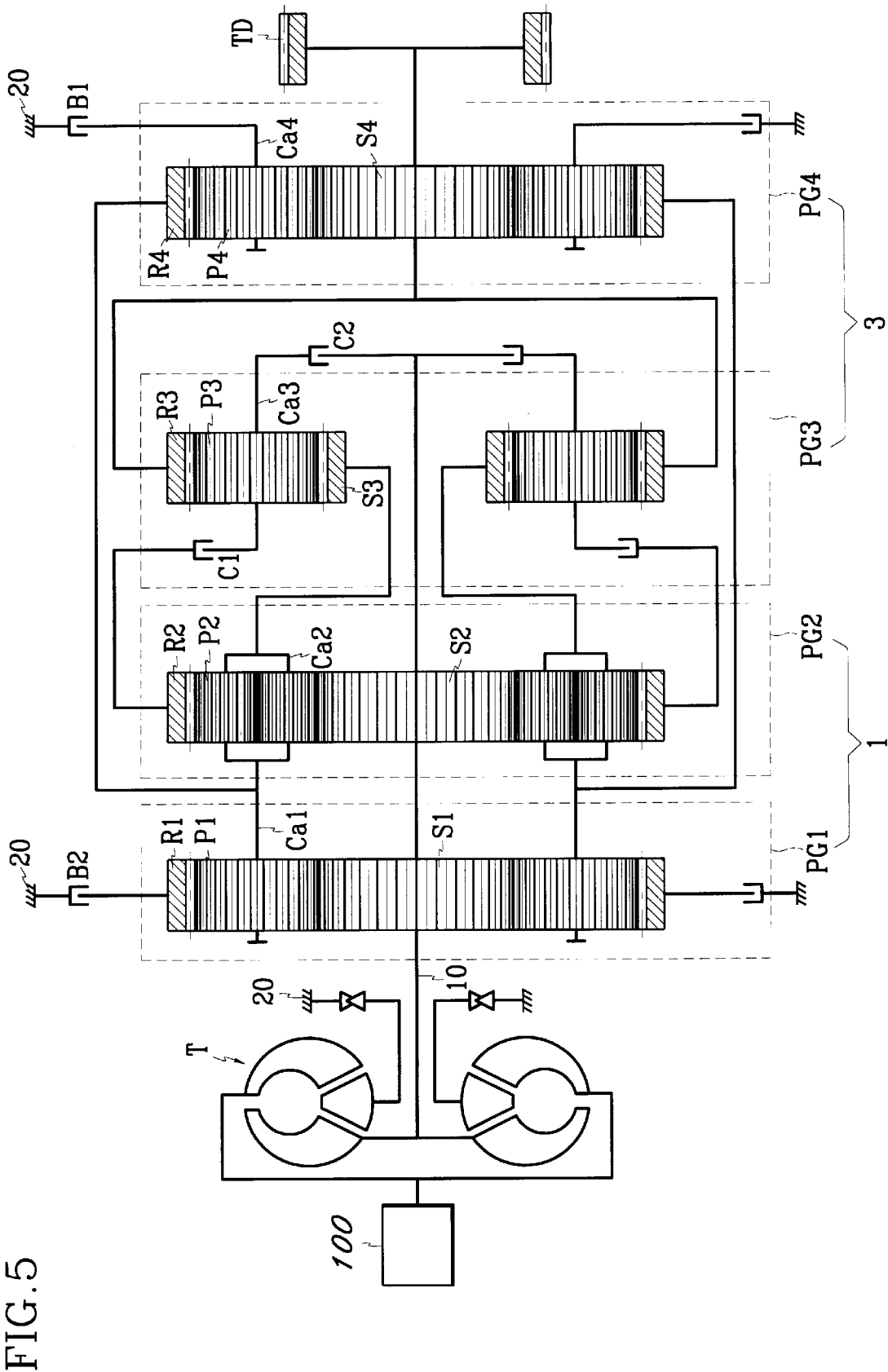
FIG. 5 is a schematic diagram illustrating a geartrain according to a fifth embodiment of the present invention.

Referring to FIG. 5, there is shown a schematic diagram of a geartrain according to a fifth embodiment of the present invention.

The geartrain of this embodiment comprises an engine 100 for generating power, a torque converter T for multiplying torque generated from the engine, and first and second compound planetary gear units 1 and 3 for receiving converted torque through an input shaft 10 and for outputting five forward speeds and one reverse speed to a transfer drive gear TD.

The first compound planetary gear unit 1 has a first simple planetary gearset PG1 which is a single pinion planetary gearset and a second simple planetary gearset PG2 which is a double pinion planetary gearset.

In the first compound planetary gear unit 1, a sun gear S1 of the first simple planetary gearset PG1 is fixedly connected to a sun gear S2 of the second simple planetary gearset PG2, and a planet carrier Ca1, connecting pinion gears P1 to each other, of the first simple planetary gearset PG1 is fixedly connected to a planet carrier Ca2, connecting pinion gears P2 to each other, of the second simple planetary gearset PG2. Therefore, the first compound planetary gear unit 1 consists of four operating elements, i.e., a ring gear R1 of the first simple planetary gearset PG1, a ring gear R2 of the second simple planetary gearset PG2, a combination of the sun gears S1 and S2, and a combination of the planet carriers Ca1 and Ca2.

The combination of the sun gears S1 and S2 is fixedly connected to the input shaft 10 to act as an input element, and the ring gear R1 is variably connected to a transmission housing 20 to selectively act as a reacting element.

The second compound planetary gear unit 3 has third and fourth simple planetary gearsets PG3 and PG4 each of which is a single pinion gearset.

In the second compound planetary gear unit 3, a ring gear R3 of the third simple planetary gearset PG3 is fixedly connected to a sun gear S4 of the fourth simple planetary gearset PG4, and a sun gear S3 of the third simple planetary gearset PG3 is fixedly connected to a ring gear R4 of the fourth simple planetary gearset PG4 via the planet carrier Ca2 of the second simple planetary gearset PG2. Therefore, the second compound planetary gear unit 3 consists of four operating elements, i.e., a planet carrier Ca3 of the third simple planetary gearset PG3, a planet carrier P4 of the fourth simple planetary gearset PG4, a combination of the ring gear R3 and sun gear S4, and a combination of the sun gear S3 and ring gear Ca4.

The planet carrier Ca4 of the fourth simple planetary gearset PG4 is variably connected to the transmission housing 20 to selectively act as a reacting element.

The above described first and second compound planetary gear units 1 and 3 are combined to each other. That is, the combination of the planet carriers Ca1 and Ca2 of the first and second simple planetary gearsets PG1 and PG2 is fixedly connected to the combination of the sun gear S3 and ring gear R4 of the third and fourth planetary gearsets PG3 and PG4; the ring gear R2 of the second simple planetary gearset PG2 is variably connected to the planet carrier Ca3 of the third simple planetary gearset PG3; and the combination of the sun gears S1 and S2 of the first and second simple planetary gearsets PG1 and PG2 is variably connected to the planet carrier Ca3 of the third simple planetary gearset PG3.

A first clutch C1' is interposed between the ring gear R2 of the second simple planetary gearset PG2 and the planet carrier Ca3 of the third simple planetary gearset PG3. The first clutch C1' is operated in forward first, second and third speeds to interconnect the ring gear R2 and the planet carrier Ca3. A second clutch C2 is interposed between the combination of the sun gears S1 and S2 of the first and second simple planetary gearsets PG1 and PG2 and the planet carrier Ca3 of the third simple planetary gearset PG3. The second clutch C2 is operated in forward third, fourth and fifth speeds to interconnect the combination of the sun gears S1 and S2 and the planet carrier Ca3.

In addition, a first brake B1' is interposed between the planet carrier Ca4 of the fourth simple planetary gearset PG4 and the transmission housing 20. The first brake B1' is engaged to fix the planet carrier Ca4 in forward first and fifth speeds and reverse speed. A second brake B2 is interposed between the ring gear R1 of the first simple planetary gearset PG1 and the transmission housing 20, such that it can operate in the forward second and fourth speeds and the reverse speed to fix the ring gear R1.

The above described geartrain can be illustrated as a lever representation as shown in FIG. 7. In FIG. 7, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

That is, in the first lever L1, the first operating element A indicates the combination of the sun gears S1 and S2 of the first and second simple planetary gearsets PG1 and PG2; the second operating element D indicates the ring gear R2 of the second simple planetary gearset PG2; the third operating element E indicates the combination of the planet carriers Ca1 and Ca2 of the first and second simple planetary gearsets PG1 and PG2; and the fourth operating element F denotes the ring gear R1 of the first simple planetary gearset PG1.

In the second lever L2, the first operating element G indicates the combination of the ring gear and sun gear R3 and S4 of the third and fourth simple planetary gearsets PG3 and PG4; the second operating element H indicates the planet carrier Ca3 of the third simple planetary gearset PG3; the third operating element I indicates the planet carrier Ca4 of the fourth simple planetary gearset PG4; and the fourth operating element indicates the combination of the sun gear and ring gear S3 and R4 of the third and fourth simple planetary gearsets PG3 and PG4.

In the forward first, second and third speeds D1, D2 and D3, since the first clutch C1' is operated as charted in FIG. 8, the lever representation of FIG. 7 can be illustrated as a single third lever L3 having first, second, third, fourth, fifth and sixth nodes N1, N2, N3, N4, N5 and N6 as shown in FIG. 9.

That is, in the third lever L3, the first node N1 indicates the first operating element A of the first compound planetary gear unit 1, the second node N2 indicates the first operating element G of the second compound planetary gear unit 3, the third node N3 indicates the combination of the second operating elements D and H of the first and second compound planetary gear units 1 and 3, the fourth node N4 indicates the third operating element I of the second compound planetary gear unit 3, the fifth node N5 indicates a combination of the third operating element E of the first compound planetary gear unit 1 and the fourth operating element J of the second compound planetary gear unit 3, and the sixth node N6 indicates the fourth operating element F of the first compound planetary gear unit 1.

Namely, the first node N1 becomes the combination of the sun gears S1 and S2 of the first and second simple planetary gearsets PG1 and PG2, the second node N2 becomes the combination of the ring gear R3 and sun gear S4 of the third and fourth simple planetary gearsets PG3 and PG4, the third node N3 becomes the combination of the ring gear R2 and planet carrier Ca3 of the second and third simple planetary gearsets PG2 and PG3, the fourth node N4 becomes the planet carrier Ca4 of the fourth simple planetary gearset PG4, the fifth node N5 becomes a combination of the planet carrier Ca1, planet carrier Ca2, sun gear S3 and ring gear R4 of the first, second, third and fourth simple planetary gearsets PG1, PG2, PG3 and PG4, and the sixth node N6 becomes the ring gear R1 of the first simple planetary gearset PG1.

In the forward fourth and fifth speeds, since the second clutch C2 is operated as charted in FIG. 8, the first and second levers L1 and L2 can be illustrated as a single fourth lever L4 having first through sixth nodes N1, N2, N3, N4, N5 and N6 as shown in FIG. 10.

That is, in the fourth lever L4, the first node N1 indicates the first operating element G of the second compound planetary gear unit 3, the second node N2 indicates a combination of the first operating element A of the first compound planetary gear unit 1 and the second operating element H of the second compound planetary gear unit 3, the third node N3 indicates the third operating element I of the second compound planetary gear unit 3, the fourth node N4 indicates the second operating element D of the first compound planetary gear unit 1, the fifth node N5 indicates a combination of the third operating element E of the first compound planetary gear unit 1 and the fourth operating element J of the second compound planetary gear unit 3, and the sixth node N6 denotes the fourth operating element F of the first compound planetary gear unit 1.

That is, the first node N1 becomes the combination of the ring gear R3 and sun gear S4 of the third and fourth simple planetary gearsets PG3 and PG4, the second node N2 becomes the combination of the sun gears S1 and S2 and planet carrier Ca3 of the first, second and third simple planetary gearsets PG1, PG2 and PG3, the third node N3 becomes the planet carrier Ca4 of the fourth simple planetary gearsets PG4, the fourth node N4 becomes the ring gear R2 of the second simple planetary gearset PG2, the fifth node N5 becomes the planet carrier Ca1, planet carrier Ca2, sun gear S3, and ring gear R4 of the first, second, third and fourth simple planetary gearsets PG1, PG2, PG3 and PG4, and the sixth node N6 becomes the ring gear R1 of the first simple planetary gearset PG1.

When a shift mode is selected in a reverse mode, the first and second clutches C' and C2 are disengaged, and the first and second brakes B1' and B2 are operated as charted in FIG. 8.

Accordingly, in the reverse mode, the first and second levers L1 and L2 can be illustrated as a single lever L5 having first through sixth nodes N1 through N6 as shown in FIG. 11.

That is, in the fifth lever L5, the first node N1 indicates the first operating element G of the second compound planetary gear unit 3, the second node N2 indicates the second operating element H of the second compound planetary gear unit 3, the third node N3 indicates a combination of the fourth operating element F of the first compound planetary gear unit 1 and the third operating element I of the second compound planetary gear unit 3, the fourth node N4 indicates a combination of the third operating element E of the first compound planetary gear unit 1 and the fourth operating element J of the second compound planetary gear unit 3, the fifth node N5 denotes the second operating element D of the first compound planetary gear unit 1, and the sixth node N6 indicates the first operating element A of the first compound planetary gear unit 1.

That is, the first node N1 becomes the combination of the ring gear R3 and sun gear S4 of the third and fourth planetary gearsets PG3 and PG4, the second node N2 becomes the planet carrier Ca3 of the third simple planetary gearset PG3, the third node N3 becomes the combination of the ring gear R1 and planet carrier Ca4 of the first and fourth simple planetary gearsets PG1 and PG4, the fourth node N4 becomes the combination of the planet carrier Ca1, planet carrier Ca2, sun gear S3 and ring gear R4 of the first, second, third and fourth simple planetary gearsets PG1, PG2, PG3 and PG4, the fifth node N5 becomes the ring gear R2 of the second simple planetary gearset PG2, and the sixth node N6 becomes the combination of the sun gears S1 and S2 of the first and second simple planetary gearsets PG1 and PG2.

[Sixth Embodiment]

Figure 6:
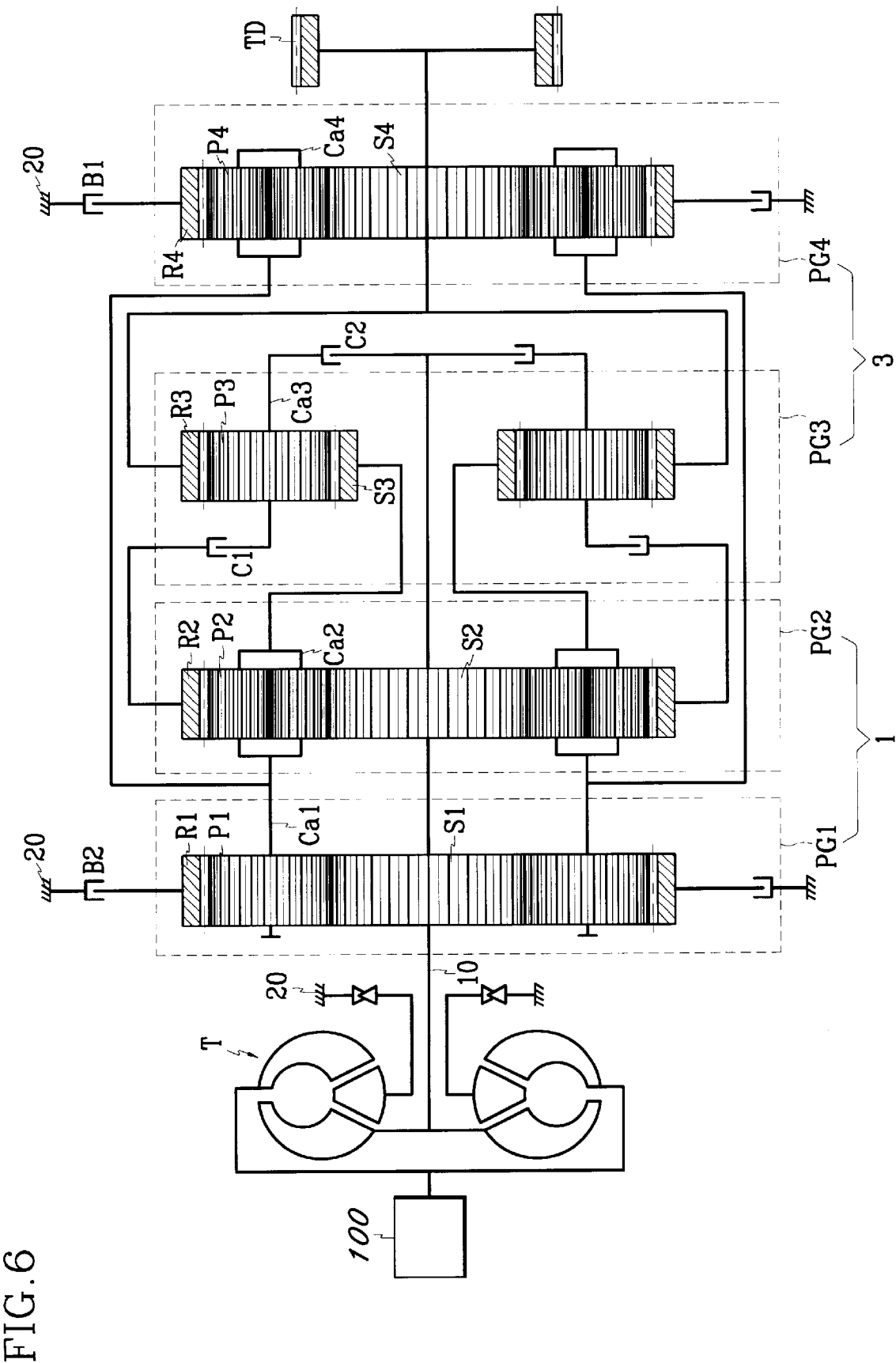
FIG. 6 is a schematic diagram illustrating a geartrain according to a sixth embodiment of the present invention.

Referring to FIG. 6, there is shown a schematic diagram of a geartrain according to a sixth embodiment of the present invention.

The geartrain of this embodiment comprises an engine 100 for generating power, a torque converter T for multiplying torque generated from the engine, and first and second compound planetary gear units 1 and 3 for receiving converted torque through an input shaft 10 and for outputting five forward speeds and one reverse speed to a transfer drive gear TD.

Since the structure of the first compound planetary gear unit 1 of this embodiment is the same as that of the fifth embodiment, the detailed description thereof will be omitted herein and incorporated as a reference.

The second compound planetary gear unit 3 has a third simple planetary gearsets PG3 which is a single planetary gearset and a fourth simple planetary gearset which is a double pinion gearset.

In the second compound planetary gear unit 3, a ring gear R3 of the third simple planetary gearset PG3 is fixedly connected to a sun gear S4 of the fourth simple planetary gearset PG4, and a sun gear S3 of the third simple planetary gearset PG3 is fixedly connected to a planet carrier Ca4 of the fourth simple planetary gearset PG4 via the planet carrier Ca2 of the second simple planetary gearset PG2. Therefore, the second compound planetary gear unit 3 consists of four operating elements, i.e., a planet carrier Ca3 of the third simple planetary gearset PG3, a ring gear R4 of the fourth simple planetary gearset PG4, a combination of the ring gear R3 and sun gear S4, and a combination of the sun gear S3 and planet carrier Ca4.

The ring gear R4 of the fourth simple planetary gearset PG4 is variably connected to a transmission housing 20 to act as a reacting element. The planet carrier Ca3 of the third simple planetary gearset PG3 is variably connected to the combination of the sun gears S1 and S2 of the first and second simple planetary gearsets PG1 and PG2.

The above described first and second compound planetary gear units 1 and 3 are combined to each other. That is, the combination of the planet carriers Ca1 and Ca2 of the first and second simple planetary gearsets PG1 and PG2 is fixedly connected to the combination of the sun gear S3 and planet carrier Ca4 of the third and fourth planetary gearsets PG3 and PG4; the ring gear R2 of the second simple planetary gearset PG2 is variably connected to the planet carrier Ca3 of the third simple planetary gearset PG3; the combination of the sun gears S1 and S2 of the first and second simple planetary gearsets PG1 and PG2 is variably connected to the planet carrier Ca3 of the third simple planetary gearset PG3; and the combination of the ring gear R3 and sun gear S4 of the third and fourth simple planetary gearsets PG3 and PG4 is fixedly connected to the transfer drive gear TD which transmits shifted rotating force to a final reduction gear (not shown).

A first clutch C1' is interposed between the ring gear R2 of the second simple planetary gearset PG2 and the planet carrier Ca3 of the third simple planetary gearset PG3. The first clutch C1' is operated in forward first, second and third speeds to interconnect the ring gear R2 and the planet carrier Ca3. A second clutch C2 is interposed between the combination of the sun gears S1 and S2 of the first and second simple planetary gearsets PG1 and PG2 and the planet carrier Ca3 of the third simple planetary gearset PG3. The second clutch C2 is operated in forward third, fourth and fifth speeds to interconnect the combination of the sun gears S1 and S2 and the planet carrier Ca3.

In addition, a first brake B1 is interposed between the ring gear R4 of the fourth simple planetary gearset PG4 and the transmission housing 20. The first brake B1 is engaged to fix the ring gear Ca4 in forward first and fifth speeds and reverse speed. A second brake B2 is interposed between the ring gear R1 of the first simple planetary gearset PG1 and the transmission housing 20, such that it can operate in the forward second and fourth speeds and the reverse speed to fix the ring gear R1.

The above described geartrain can be illustrated as a lever representation as shown in FIG. 7. In FIG. 7, levers L1 and L2 indicate the first and second compound planetary gear units 1 and 3, respectively. The four operating elements of the first compound planetary gear units 1 are indicated as first, second, third and fourth operating elements A, D, E and F on the first lever L1, and the four operating elements of the second compound planetary gear unit 3 are indicated as first, second, third and fourth operating elements G, H, I and J on the second lever L2.

Since the structure of the first planetary gearset 1 of this embodiment are the same as that of the fifth embodiment, the description thereof will be omitted herein.

In the second lever L2, the first operating element G indicates the combination of the ring gear R3 and sun gear S4 of the third and fourth simple planetary gearsets PG3 and PG4; the second operating element H indicates the planet carrier Ca3 of the third simple planetary gearset PG3; the third operating element I indicates the ring gear R4 of the fourth simple planetary gearset PG4; and the fourth operating element J indicates the combination of the sun gear S3 and planet carrier Ca4 of the third and fourth simple planetary gearsets PG3 and PG4.

In the forward first, second and third speeds D1, D2 and D3, since the first clutch C1' is operated as charted in FIG. 8, the lever representation of FIG. 7 can be illustrated as a single third lever L3 having first, second, third, fourth, fifth and sixth nodes N1, N2, N3, N4, N5 and N6 as shown in FIG. 9.

That is, in the third lever L3, the first node N1 indicates the first operating element A of the first compound planetary gear unit 1, the second node N2 indicates the first operating element G of the second compound planetary gear unit 3, the third node N3 indicates the combination of the second operating elements D and H of the first and second compound planetary gear units 1 and 3, the fourth node N4 indicates the third operating element I of the second compound planetary gear unit 3, the fifth node N5 indicates a combination of the third operating element E of the first compound planetary gear unit 1 and the fourth operating element J of the second compound planetary gear unit 3, and the sixth node N6 indicates the fourth operating element F of the first compound planetary gear unit 1.

Namely, the first node N1 becomes the combination of the sun gears S1 and S2 of the first and second simple planetary gearsets PG1 and PG2, the second node N2 becomes the combination of the ring gear R3 and sun gear S4 of the third and fourth simple planetary gearsets PG3 and PG4, the third node N3 becomes the combination of the ring gear R2 and planet carrier Ca3 of the second and third simple planetary gearsets PG2 and PG3, the fourth node N4 becomes the ring gear R4 of the fourth simple planetary gearset PG4, the fifth node N5 becomes a combination of the planet carrier Ca1, planet carrier Ca2, sun gear S3 and planet carrier Ca4 of the first, second, third and fourth simple planetary gearsets PG1, PG2, PG3 and PG4, and the sixth node N6 becomes the ring gear R1 of the first simple planetary gearset PG1.

In the forward fourth and fifth speeds, since the second clutch C2 is operated as charted in FIG. 8, the first and second levers L1 and L2 can be illustrated as a single fourth lever L4 having first through sixth nodes N1, N2, N3, N4, N5 and N6 as shown in FIG. 10.

That is, in the fourth lever L4, the first node N1 indicates the first operating element G of the second compound planetary gear unit 3, the second node N2 indicates a combination of the first operating element A of the first compound planetary gear unit 1 and the second operating element H of the second compound planetary gear unit 3, the third node N3 indicates the third operating element I of the second compound planetary gear unit 3, the fourth node N4 indicates the second operating element D of the first compound planetary gear unit 1, the fifth node N5 indicates a combination of the third operating element E of the first compound planetary gear unit 1 and the fourth operating element J of the second compound planetary gear unit 3, and the sixth node N6 denotes the fourth operating element F of the first compound planetary gear unit 1.

That is, the first node N1 becomes the combination of the ring gear R3 and sun gear S4 of the third and fourth simple planetary gearsets PG3 and PG4, the second node N2 becomes the combination of the sun gears S1 and S2 and planet carrier Ca3 of the first, second and third simple planetary gearsets PG1, PG2 and PG3, the third node N3 becomes the ring gear R4 of the fourth simple planetary gearsets PG4, the fourth node N4 becomes the ring gear R2 of the second simple planetary gearset PG2, the fifth node N5 becomes the planet carrier Ca1, planet carrier Ca2, sun gear S3, and planet carrier Ca4 of the first, second, third and fourth simple planetary gearsets PG1, PG2, PG3 and PG4, and the sixth node N6 becomes the ring gear R1 of the first simple planetary gearset PG1.

When a shift mode is selected in a reverse mode, the first and second clutches C1' and C2 are disengaged, and the first and second brakes B1 and B2 are operated as charted in FIG. 8.

Accordingly, in the reverse mode, the first and second levers L1 and L2 can be illustrated as a single lever L5 having first through sixth nodes N1 through N6 as shown in FIG. 11.

That is, in the fifth lever L5, the first node N1 indicates the first operating element G of the second compound planetary gear unit 3, the second node N2 indicates the second operating element H of the second compound planetary gear unit 3, the third node N3 indicates a combination of the fourth operating element F of the first compound planetary gear unit 1 and the third operating element I of the second compound planetary gear unit 3, the fourth node N4 indicates a combination of the third operating element E of the first compound planetary gear unit 1 and the fourth operating element J of the second compound planetary gear unit 3, the fifth node N5 denotes the second operating element D of the first compound planetary gear unit 1, and the sixth node N6 indicates the first operating element A of the first compound planetary gear unit 1.

That is, the first node N1 becomes the combination of the ring gear R3 and sun gear S4 of the third and fourth planetary gearsets PG3 and PG4, the second node N2 becomes the planet carrier Ca3 of the third simple planetary gearset PG3, the third node N3 becomes the combination of the ring gears R1 and R4 of the first and fourth simple planetary gearsets PG1 and PG4, the fourth node N4 becomes the combination of the planet carrier Ca1, planet carrier R2, sun gear S3 and planet carrier Ca4 of the first, second, third and fourth simple planetary gearsets PG1, PG2, PG3 and PG4, the fifth node N5 becomes the ring gear R2 of the second simple planetary gearset PG2, and the sixth node N6 becomes the combination of the sun gears S1 and S2 of the first and second simple planetary gearsets PG1 and PG2.

Various details of the invention may be changed without departing from its spirit nor its scope. Furthermore, the foregoing description of the embodiments according to the present invention is provided for the purposed of illustration only, and not for the purpose of limiting the invention as defined by the appended claims and their equivalents.

What is claimed is:

1. A geartrain for a five-speed automatic transmission, comprising:

a first compound planetary gear unit comprising first and second simple planetary gearsets having first, second, third, and fourth operating elements, said first operating element acting as an input element;

a second compound planetary gear unit comprising third and fourth simple planetary gearsets having fifth, sixth, seventh, and eighth operating elements, said fifth operating element acting as an output element, said sixth operating element being variably connected to either the first operating element or the second operating element, and said eighth operating element being fixedly connected to the third operating element;

clutch means for variably connecting said sixth operating element to either the first operating element or the second operating element; and brake means for selectively connecting at least one of the operating elements of the first and second planetary gear units to a transmission housing;

wherein the first operating element is a combination of a sun gear of the first simple planetary gearset and a sun gear of the second simple planetary gearset;

the second operating element is a planet carrier of the second simple planetary gearset;

the third operating element is a combination of a planet carrier of the first simple planetary gearset and a ring gear of the second simple planetary gearset; and the fourth operating is a ring gear of the first simple planetary gearset.

2. A geartrain of claim 1, wherein the fifth operating element is a combination of a planet carrier of the third simple planetary gearset and a sun gear of the fourth simple planetary gearset;

the sixth operating element is a ring gear of the third simple planetary gearset;

the seventh operating element is a ring gear of the fourth simple planetary gearset; and the eighth operating element is a combination of a sun gear of the third simple planetary gearset and a planet carrier of the fourth simple planetary gearset.

3. A geartrain of claim 2, wherein the clutch means comprises a first clutch interposed between the planet carrier of the second simple planetary gearset and the ring gear of the third simple planetary gearset and a second clutch interposed between the combination of the sun gears of the first and second simple planetary gearsets and the ring gear of the third simple planetary gearset.

4. A geartrain of claim 2, wherein the brake means comprises a first brake interposed between the ring gear of the first simple planetary gearset and the transmission housing and a second brake interposed between the ring gear of the fourth simple planetary gearset and the transmission housing.

5. A geartrain of claim 1, wherein one of the third and fourth simple planetary gearsets is a double pinion planetary gearset and one of the third and fourth simple planetary gearsets is a single pinion planetary gearset.

6. A geartrain of claim 1, wherein the fifth operating element is a combination of a planet carrier of the third simple planetary gearset and a sun gear of the fourth simple planetary gearset;

the sixth operating element is a ring gear of the third simple planetary gearset;

the seventh operating element is a planet carrier of the fourth simple planetary gearset; and the eighth operating element is a combination of a sun gear of the third simple planetary gearset and a ring gear of the fourth simple planetary gearset.

7. A geartrain of claim 6, wherein the clutch means comprises a first clutch interposed between the planet carrier of the second simple planetary gearset and the ring gear of the third simple planetary gearset and a second clutch interposed between the combination of the sun gears of the first and second simple planetary gearsets and the ring gear of the third simple planetary gearset.

8. A geartrain of claim 6, wherein the brake means comprises a first brake interposed between the ring gear of the first simple planetary gearset and the transmission housing and a second brake interposed between the planet carrier of the fourth simple planetary gearset and the transmission housing.

9. A geartrain of claim 1, wherein the fifth operating element is a combination of a ring gear of the third simple planetary gearset and a sun gear of the fourth simple planetary gearset;

the sixth operating element is a planet carrier of the third simple planetary gearset;

the seventh operating element is a planet carrier of the fourth simple planetary gearset; and the eighth operating element is a combination of a sun gear of the third simple planetary gearset and a ring gear of the fourth simple planetary gearset.

10. A geartrain of claim 9, wherein the clutch means comprises a first clutch interposed between the planet carrier of the second simple planetary gearset and the planet carrier of the third simple planetary gearset and a second clutch interposed between the combination of the sun gears of the first and second simple planetary gearsets and the planet carrier of the third simple planetary gearset.

11. A geartrain of claim 9, wherein the brake means comprises a first brake interposed between the ring gear of the first simple planetary gearset and the transmission housing and a second brake interposed between the planet carrier of the fourth simple planetary gearset and the transmission housing.

12. A geartrain of claim 1, wherein the fifth operating element is a combination of a ring gear of the third simple planetary gearset and a sun gear of the fourth simple planetary gearset;

the sixth operating element is a planet carrier of the third simple planetary gearset;

the seventh operating element is a ring gear of the fourth simple planetary gearset; and the eighth operating element is a combination of a sun gear of the third simple planetary gearset and a planet carrier of the fourth simple planetary gearset.

13. A geartrain of claim 12, wherein the clutch means Comprises a first clutch interposed between the planet carrier of the second simple planetary gearset and the planet carrier of the third simple planetary gearset and a second clutch interposed between the combination of the sun gears of the first and second simple planetary gearsets and the planet carrier of the third simple planetary gearset.

14. A geartrain of claim 12, wherein the brake means comprises a first brake interposed between the ring gear of the first simple planetary gearset and the transmission housing and a second brake interposed between the ring gear of the fourth simple planetary gearset and the transmission housing.

15. A geartrain for a five-speed automatic transmission, comprising:

a first compound planetary gear unit comprising first and second simple planetary gearsets having first, second, third, and fourth operating elements, said first operating element acting as an input element;

a second compound planetary gear unit comprising third and fourth simple planetary gearsets having fifth, sixth, seventh, and eighth operating elements, said fifth operating element acting as an output element, said sixth operating element being variably connected to either the first operating element or the second operating element, and said eighth operating element being fixedly connected to the third operating element;

clutch means for variably connecting said sixth operating element to either the first operating element or the second operating element; and brake means for selectively connecting at least one of the operating elements of the first and second planetary gear units to a transmission housing;

wherein the first operating element is a combination of a sun gear of the first simple planetary gearset and a sun gear of the second simple planetary gearset;

the second operating element is a ring gear of the second simple planetary gearset;

the third operating element is a combination of a planet carrier of the first simple planetary gearset and a planet carrier of the second simple planetary gearset; and the fourth operating element is a ring gear of the first simple planetary gearset.

16. A geartrain of claim 15, wherein the fifth operating element is a combination of a ring gear of the third simple planetary gearset and a sun gear of the fourth simple planetary gearset;

the sixth operating element is a planet carrier of the third simple planetary gearset;

the seventh operating element is a planet carrier of the fourth simple planetary gearset; and the eighth operating element is a combination of a sun gear of the third simple planetary gearset and a ring gear of the fourth simple planetary gearset.

17. A geartrain of claim 16, wherein the clutch means comprises a first clutch interposed between the combination of the sun gears of the first and second simple planetary gearsets and the planet carrier of the third simple planetary gearset and a second clutch interposed between the ring gear of the second simple planetary gearsets and the planet carrier of the third simple planetary gearset.

18. A geartrain of claim 16, wherein the brake means comprises a first brake interposed between the ring gear of the first simple planetary gearset and the transmission housing and a second brake interposed between the planet carrier of the fourth simple planetary gearset and the transmission housing.

19. A geartrain of claim 15, wherein the fifth operating element is a combination of a ring gear of the third simple planetary gearset and a sun gear of the fourth simple planetary gearset;

the sixth operating element is a planet carrier of the third simple planetary gearset;

the seventh operating element is a ring gear of the fourth simple planetary gearset; and the eighth operating element is a combination of a sun gear of the third simple planetary gearset and a planet carrier of the fourth simple planetary gearset.

20. A geartrain of claim 19, wherein the clutch means comprises a first clutch interposed between the combination of the sun gears of the first and second simple planetary gearsets and the planet carrier of the third simple planetary gearset and a second clutch interposed between the ring gear of the second simple planetary gearsets and the planet carrier of the third simple planetary gearset.

21. A geartrain of claim 19, wherein the brake means comprises a first brake interposed between the ring gear of the first simple planetary gearset and the transmission housing and a second brake interposed between the ring gear of the fourth simple planetary gearset and the transmission housing.

22. A five-speed automatic transmission comprising:

a torque converter for multiplying torque generated from an engine;

an input shaft connected to the torque converter;

a first compound planetary gear unit comprising first and second simple planetary gearsets having first, second, third, and fourth operating elements, said first operating element being fixedly connected to the input shaft to act as an input element;

a second compound planetary gear unit comprising third and fourth simple planetary gearsets having fifth, sixth, seventh, and eighth operating elements, said fifth operating element being connected to an output shaft to act as an output element, said sixth operating element being variably connected to either the first operating element or the second operating element, and said eighth operating element being fixedly connected to the third operating element;

clutch means for variably connecting said sixth operating element to either the first operating element or the second operating element; and brake means for selectively connecting at least one of the operating elements of the first and second planetary gear units to a transmission housing;

wherein the first operating element is a combination of a sun gear of the first simple planetary gearset and a sun gear of the second simple planetary gearset;

the second operating element is a planet carrier of the second simple planetary gearset;

the third operating element is a combination of a planet carrier of the first simple planetary gearset and a ring gear of the second simple planetary gearset; and the fourth operating element is a ring gear of the first simple planetary gearset.

23. An automatic transmission of claim 22, wherein the fifth operating element is a combination of a planet carrier of the third simple planetary gearset and a sun gear of the fourth simple planetary gearset;

the sixth operating element is a ring gear of the third simple planetary gearset;

the seventh operating element is a ring gear of the fourth simple planetary gearset; and the eighth operating element is a combination of a sun gear of the third simple planetary gearset and a planet carrier of the fourth simple planetary gearset.

24. An automatic transmission of claim 23, wherein the clutch means comprises a first clutch interposed between the planet carrier of the second simple planetary gearset and the ring gear of the third simple planetary gearset and a second clutch interposed between the combination of the sun gears of the first and second simple planetary gearsets and the ring gear of the third simple planetary gearset.

25. An automatic transmission of claim 23, wherein the brake means comprises a first brake interposed between the ring gear of the first simple planetary gearset and the transmission housing and a second brake interposed between the ring gear of the fourth simple planetary gearset and the transmission housing.

26. An automatic transmission of claim 22, wherein one of the third and fourth simple planetary gearsets is a double pinion planetary gearset and one of the third and fourth simple planetary gearsets is a single pinion planetary gearset.

27. An automatic transmission of claim 22, wherein the fifth operating element is a combination of a planet carrier of the third simple planetary gearset and a sun gear of the fourth simple planetary gearset;

the sixth operating element is a ring gear of the third simple planetary gearset;

the seventh operating element is a planet carrier of the fourth simple planetary gearset; and the eighth operating element is a combination of a sun gear of the third simple planetary gearset and a ring gear of the fourth simple planetary gearset.

28. An automatic transmission of claim 27, wherein the clutch means comprises a first clutch interposed between the planet carrier of the second simple planetary gearset and the ring gear of the third simple planetary gearset and a second clutch interposed between the combination of the sun gears of the first and second simple planetary gearsets and the ring gear of the third simple planetary gearset.

29. An automatic transmission of claim 27, wherein the brake means comprises a first brake interposed between the ring gear of the first simple planetary gearset and the transmission housing and a second brake interposed between the planet carrier of the fourth simple planetary gearset and the transmission housing.

30. An automatic transmission of claim 22, wherein the fifth operating element is a combination of a ring gear of the third simple planetary gearset and a sun gear of the fourth simple planetary gearset;

the sixth operating element is a planet carrier of the third simple planetary gearset;

the seventh operating element is a planet carrier of the fourth simple planetary gearset; and the eighth operating element is a combination of a sun gear of the third simple planetary gearset and a ring gear of the fourth simple planetary gearset.

31. An automatic transmission of claim 30, wherein the clutch means comprises a first clutch interposed between the planet carrier of the second simple planetary gearset and the planet carrier of the third simple planetary gearset and a second clutch interposed between the combination of the sun gears of the first and second simple planetary gearsets and the planet carrier of the third simple planetary gearset.

32. An automatic transmission of claim 30, wherein the brake means comprises a first brake interposed between the ring gear of the first simple planetary gearset and the transmission housing and a second brake interposed between the planet carrier of the fourth simple planetary gearset and the transmission housing.

33. An automatic transmission of claim 22, wherein the fifth operating element is a combination of a ring gear of the third simple planetary gearset and a sun gear of the fourth simple planetary gearset;

the sixth operating element is a planet carrier of the third simple planetary gearset;

the seventh operating element is a ring gear of the fourth simple planetary gearset; and the eighth operating element is a combination of a sun gear of the third simple planetary gearset and a planet carrier of the fourth simple planetary gearset.

34. An automatic transmission of claim 33, wherein the clutch means comprises a first clutch interposed between the planet carrier of the second simple planetary gearset and the planet carrier of the third simple planetary gearset and a second clutch interposed between the combination of the sun gears of the first and second simple planetary gearsets and the planet carrier of the third simple planetary gearset.

35. An automatic transmission of claim 33, wherein the brake means comprises a first brake interposed between the ring gear of the first simple planetary gearset and the transmission housing and a second brake interposed between the ring gear of the fourth simple planetary gearset and the transmission housing.

* * * * *